United States Patent
Cheng

(10) Patent No.: US 12,388,586 B2
(45) Date of Patent: Aug. 12, 2025

(54) MEASUREMENT GAP CONFIGURATION AND COORDINATION

(71) Applicant: Qualcomm Incorporated, San Diego, CA (US)

(72) Inventor: Peng Cheng, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 841 days.

(21) Appl. No.: 17/270,636

(22) PCT Filed: Sep. 24, 2019

(86) PCT No.: PCT/CN2019/107420
§ 371 (c)(1),
(2) Date: Feb. 23, 2021

(87) PCT Pub. No.: WO2020/063559
PCT Pub. Date: Apr. 2, 2020

(65) Prior Publication Data
US 2021/0226750 A1 Jul. 22, 2021

(30) Foreign Application Priority Data
Sep. 28, 2018 (WO) ............... PCT/CN2018/108184

(51) Int. Cl.
*H04L 5/00* (2006.01)
*H04W 36/00* (2009.01)
(Continued)

(52) U.S. Cl.
CPC .......... *H04L 5/0032* (2013.01); *H04L 5/0041* (2013.01); *H04W 72/0453* (2013.01); *H04W 72/23* (2023.01); *H04W 36/00698* (2023.05)

(58) Field of Classification Search
None
See application file for complete search history.

(56) References Cited

U.S. PATENT DOCUMENTS 10,959,119 B2 * 3/2021 Jang .................... H04L 25/0226
11,917,443 B2 * 2/2024 Chen .................... H04W 24/10
(Continued)

FOREIGN PATENT DOCUMENTS

| CN | 101998486 A | 3/2011 |
| WO | WO-2017027066 A1 | 2/2017 |
| WO | WO-2018144927 A1 | 8/2018 |

OTHER PUBLICATIONS

Ericsson: "MR-DC and NR-DC Measurement Principles", 3GPP Draft, 3GPP TSG-RAN WG2#103bis, R2-1814678—MR-DC Measurement Principles, 3rd Generation Partnership Project (3GPP), Mobile Competence Centre, 650, Route Des Lucioles, F-06921 Sophia-Antipolis Cedex, France, vol. RAN WG2, No. Chengdu, China, Oct. 8-Oct. 12, 2018, Sep. 27, 2018 (Sep. 27, 2018), XP051524070, 5 Pages, Retrieved from the Internet: URL: http://www.3gpp.org/ftp/tsg%5Fran/WG2%5FRL2/TSGR2%5F103bis/Docs/R2%2D1814678%2Ezip [Retrieved on Sep. 27, 2018] paragraph [0002].
(Continued)

*Primary Examiner* — Mariela Vidal Carpio
(74) *Attorney, Agent, or Firm* — Holland & Hart LLP

(57) ABSTRACT

Methods, systems, and devices for wireless communications are described. A user equipment (UE) may operate in dual connectivity with a master node (MN) that has a capability to operate in a particular frequency band range (e.g., a range above 6 gigahertz (GHz)) and a secondary node (SN). The MN or SN may transmit an indication to an SN or MN, respectively, that includes sets of frequency bands in which the UE may measure, including frequency bands within the particular frequency band range. The SN or MN that received the indication may update a gap pattern for at least one of the frequency bands within the particular frequency band range and transmit an updated gap configuration to the MN or SN that transmitted the indication. Additionally, the
(Continued)

MN or SN may choose fixed gap pattern configuration roles or may both dynamically identify gap patterns.

30 Claims, 17 Drawing Sheets

(51) Int. Cl.
*H04W 72/0453* (2023.01)
*H04W 72/23* (2023.01)

(56) References Cited

U.S. PATENT DOCUMENTS

| | | | | |
|---|---|---|---|---|
| 11,974,239 | B2* | 4/2024 | Han | H04W 76/15 |
| 2012/0178465 | A1* | 7/2012 | Lin | H04W 24/10 455/450 |
| 2015/0087296 | A1* | 3/2015 | Kim | H04W 52/04 455/422.1 |
| 2017/0359632 | A1* | 12/2017 | Qu | H04W 36/0069 |
| 2019/0075585 | A1* | 3/2019 | Deogun | H04B 7/02 |
| 2019/0173634 | A1* | 6/2019 | Teyeb | H04W 24/10 |
| 2020/0128453 | A1* | 4/2020 | Teyeb | H04W 36/0072 |
| 2020/0169906 | A1* | 5/2020 | Tsuboi | H04W 76/27 |
| 2020/0178102 | A1* | 6/2020 | Chen | H04W 24/10 |
| 2021/0136616 | A1* | 5/2021 | Xie | H04W 24/10 |
| 2021/0144658 | A1* | 5/2021 | Han | H04W 72/27 |
| 2021/0226750 | A1* | 7/2021 | Cheng | H04W 72/0453 |
| 2021/0227413 | A1* | 7/2021 | Yang | H04W 36/0069 |
| 2021/0227610 | A1* | 7/2021 | Cui | H04W 76/15 |
| 2021/0297970 | A1* | 9/2021 | Tang | H04W 56/001 |
| 2021/0298103 | A1* | 9/2021 | Yilmaz | H04W 76/15 |
| 2021/0337414 | A1* | 10/2021 | Yilmaz | H04W 40/02 |
| 2022/0216959 | A1* | 7/2022 | Teyeb | H04W 76/16 |

OTHER PUBLICATIONS

Intel Corporation: "Further Discussion on UE Measurement Mode with Gap for SA", 3GPP Draft, 3GPP TSG-RAN4 Meeting #87, R4-1806333, Further Discussion on UE Measurement Mode with Gap for SA V2, 3rd Generation Partnership Project (3GPP), Mobile Competence Centre, 650, Route Des Lucioles, F-06921 Sophia-Anti, vol. RAN WG4, No. Busan, Korea, May 21-May 25, 2018, May 20, 2018 (May 20, 2018), XP051446026, 4 Pages, Retrieved from the Internet: URL: http://www.3gpp.org/ftp/Meetings%5F3GPP%5FSYNC/RAN4/Docs/ [Retrieved on May 20, 2018], paragraphs [0001], [0002].
Qualcomm Incorporated: "Discussions on Measurement Gap Configuration and Coordination in NR-DC", 3GPP Draft, 3GPP TSG-RAN WG2 Meeting#103bis, R2-1813813, Discussions on Measurement Gap Configuration and Coordination in NR-DC, 3rd Generation Partnership Project (3GPP), Mobile Competence Centre, 650, Route Des Lucioles, F-06921, vol. RAN WG2, No. Chengdu, China, Oct. 8-Oct. 12, 2018, Sep. 28, 2018 (Sep. 28, 2018), XP051523298, Retrieved from the Internet: URL: http://www.3gpp.org/ftp/tsg%5Fran/WG2%5FRL2/TSGR2%5F103bis/Docs/R2%2D1813813%2Ezip [Retrieved on Sep. 28, 2018], The Whole Document.
Supplementary European Search Report—EP19867709—Search Authority—Munich—May 18, 2022 (185232EP).
Taiwan Search Report—TW108140253—TIPO—Nov. 14, 2022 (185232TW).
CMCC: "Measurement Gap Configuration for NG EN-DC", 3GPP TSG-RAN WG2 Meeting #102, R2-1808333, May 25, 2018(May 25, 2018), 3 Pages.
International Search Report and Written Opinion—PCT/CN2018/108184—ISA/EPO—Jun. 28, 2019 (185232WO1).
International Search Report and Written Opinion—PCT/CN2019/107420—ISA/EPO—Dec. 24, 2019 (185232WO2).
Nokia et al., "TP for Gap Coordination Assistance Information", 3GPP TSG-RAN WG2 Meeting #101, R2-1803941, Mar. 2, 2018(Feb. 3, 2018), 8 Pages.
Samsung: "Measurement Gap Assistance Information", 3GPP TSG-RAN WG2 Meeting #101bis, R2-1804707, Apr. 20, 2018 (Apr. 20, 2018), 3 Pages, Section 1 and 2.
European Search Report—EP22212072—Search Authority—Munich—Mar. 15, 2023 (185232EPD1).
Nokia et al., "Consideration on Measurement Gap in NE-DC", 3GPP TSG-RAN WG2 Meeting #102, R2-1808686, 3rd Generation Partnership Project, Mobile Competence Centre, 650, Route Des Lucioles, F-06921 Sophia-Antipolis Cedex, France, vol. RAN WG2, No. Busan, South Korea, May 21-May 25, 2018, May 20, 2018, XP051444926, 3 Pages, Retrieved on May 20, 2018, The Whole Document.

\* cited by examiner

MEASUREMENT GAP CONFIGURATION AND COORDINATION

CROSS REFERENCE TO RELATED APPLICATIONS

The present Application is a 371 national phase filing of International Patent Application No. PCT/CN2019/107420 by CHENG, entitled "MEASUREMENT GAP CONFIGURATION AND COORDINATION," filed Sep. 24, 2019; and to PCT international Application No. PCT/CN2018/108184 by CHENG, entitled "MEASUREMENT GAP CONFIGURATION AND COORDINATION," filed Sep. 28, 2018, which are assigned to the assignee hereof, and which are each incorporated by reference herein in their entirety.

BACKGROUND

The following relates generally to wireless communications, and more specifically to measurement gap configuration and coordination.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may engage in an Evolved Universal Terrestrial Radio Access (E-UTRA) New Radio (NR) dual connectivity (EN-DC) with multiple base stations or nodes. For instance, a first base station may act as a master node (MN) and a second base station may act as a secondary node (SN). The base station acting as the MN and the base station acting as the SN may both have a capability to operate in a first set of frequency band ranges or bands (e.g., legacy LTE or sub 6 gigahertz (GHz) frequency band ranges). However, while the base station acting as an SN may have a capability to operate in a second set of frequency band ranges (e.g., millimeter wave (mmW) frequency band ranges), the base station acting as an MN may lack such a capability.

SUMMARY

The described techniques relate to improved methods, systems, devices, and apparatuses that support measurement gap configuration and coordination. Generally, the described techniques provide for a master node (MN) and a secondary node (SN) to operate in a dual connectivity mode with a user equipment (UE) whenever the MN has a capability to operate in a particular frequency band range (e.g., FR1, FR2, or UE-specific frequency bands). For instance, the MN may transmit an indication to the SN that includes sets of frequency bands in which the UE may measure, including frequency bands within the particular frequency band range. The SN may update a gap pattern (e.g., a measurement gap pattern for the UE) for at least one of the frequency bands within the particular frequency band range and transmit an updated gap configuration to the MN. Alternatively, the SN may transmit an indication to the MN that includes sets of frequency bands in which the UE may measure, including frequency bands within the particular frequency band range. The SN may update a gap pattern for at least one of the frequency bands within the particular frequency band range and transmit an updated gap configuration to the MN. To determine which node configures gap configurations for the different frequency bands, the MN and SN may choose fixed gap pattern configuration roles or may dynamically identify gap patterns.

A method of wireless communications at a first network node in a wireless communications system is described. The method may include receiving, from a second network node in the wireless communications system, a first indication of a first set of frequency bands associated with a UE and a first gap pattern, a second indication of a second set of frequency bands associated with the UE and a second gap pattern, and/or a UE-specific set of frequency bands associated with the UE and a UE-specific gap pattern, updating a gap pattern of the first gap pattern for at least one of the first set of frequency bands, the second gap pattern for the second set of frequency bands, the UE-specific gap pattern for the UE-specific set of frequency bands, or any combination thereof, and transmitting, to the second network node, an updated gap configuration including an indication of the updated gap pattern.

An apparatus for wireless communications at a first network node in a wireless communications system is described. The apparatus may include a processor, memory in electronic communication with the processor, and instructions stored in the memory. The instructions may be executable by the processor to cause the apparatus to receive, from a second network node in the wireless communications system, a first indication of a first set of frequency bands associated with a UE and a first gap pattern, a second indication of a second set of frequency bands associated with the UE and a second gap pattern, and/or a UE-specific set of frequency bands associated with the UE and a UE-specific gap pattern, update a gap pattern of the first gap pattern for at least one of the first set of frequency bands, the second gap pattern for the second set of frequency bands, the UE-specific gap pattern for the UE-specific set of frequency bands, or any combination thereof, and transmit, to the second network node, an updated gap configuration including an indication of the updated gap pattern.

Another apparatus for wireless communications at a first network node in a wireless communications system is described. The apparatus may include means for receiving, from a second network node in the wireless communications system, a first indication of a first set of frequency bands associated with a UE and a first gap pattern, a second indication of a second set of frequency bands associated with the UE and a second gap pattern, and/or a UE-specific set of frequency bands associated with the UE and a UE-specific gap pattern, updating a gap pattern of the first gap pattern for at least one of the first set of frequency bands, the second gap pattern for the second set of frequency bands, the UE-specific gap pattern for the UE-specific set of frequency bands, or any combination thereof, and transmitting, to the second network node, an updated gap configuration including an indication of the updated gap pattern.

A non-transitory computer-readable medium storing code for wireless communications at a first network node in a wireless communications system is described. The code may include instructions executable by a processor to receive, from a second network node in the wireless communications system, a first indication of a first set of frequency bands associated with a UE and a first gap pattern, a second indication of a second set of frequency bands associated with the UE and a second gap pattern, and/or a UE-specific set of frequency bands associated with the UE and a UE-specific gap pattern, update a gap pattern of the first gap pattern for at least one of the first set of frequency bands, the second gap pattern for the second set of frequency bands, the UE-specific gap pattern for the UE-specific set of frequency bands, or any combination thereof, and transmit, to the second network node, an updated gap configuration including an indication of the updated gap pattern.

In some examples of the method, apparatuses, and non-transitory computer-readable medium described herein, updating the gap pattern may include operations, features, means, or instructions for determining a new gap pattern for each of the first set of frequency bands, the second set of frequency bands, and the UE-specific set of frequency bands, where the updated gap configuration indicates each new gap pattern, where the first network node includes a master network node.

In some examples of the method, apparatuses, and non-transitory computer-readable medium described herein, transmitting the updated gap configuration may include operations, features, means, or instructions for transmitting a gap type associated with the first set of frequency bands, the second set of frequency bands, or the UE-specific set of frequency bands based on updating the gap pattern.

Some examples of the method, apparatuses, and non-transitory computer-readable medium described herein may further include operations, features, means, or instructions for determining a new gap for at least one of the first set of frequency bands and the second set of frequency bands, transmitting, to the UE, a gap configuration indicating the new gap and transmitting a node message to the second network node indicating a UE configuration based on the new gap.

Some examples of the method, apparatuses, and non-transitory computer-readable medium described herein may further include operations, features, means, or instructions for transmitting, to the second network node, a list of frequency bands of the first and second sets of frequency bands associated with the new gap.

Some examples of the method, apparatuses, and non-transitory computer-readable medium described herein may further include operations, features, means, or instructions for receiving, from the second network node, a node message indicating a UE configuration having a modified gap for at least one of the first and second sets of frequency bands.

In some examples of the method, apparatuses, and non-transitory computer-readable medium described herein, the first network node may be one of a master network node and a secondary network node and the second network node may be the other of the master network node and the secondary network node.

In some examples of the method, apparatuses, and non-transitory computer-readable medium described herein, the master network node includes a new radio (NR) network node and the secondary network node includes an evolved universal terrestrial radio access network (EUTRAN) network node.

In some examples of the method, apparatuses, and non-transitory computer-readable medium described herein, the master network node and the secondary network node both include new radio (NR) network nodes.

In some examples of the method, apparatuses, and non-transitory computer-readable medium described herein, the first and second sets of frequency bands may be non-overlapping.

In some examples of the method, apparatuses, and non-transitory computer-readable medium described herein, the gap pattern includes a measurement gap configuration, a measurement gap sharing configuration, or any combination thereof.

In some examples of the method, apparatuses, and non-transitory computer-readable medium described herein, the first set of frequency bands include a set of sub 6 gigahertz (GHz) frequencies and the second set of frequency bands include a set of frequency bands above 6 GHz.

A method of wireless communications at a first network node in a wireless communications system is described. The method may include transmitting, to a second network node in the wireless communications system, a first indication of a first set of frequency bands associated with a UE and a first gap pattern, a second indication of a second set of frequency bands associated with the UE and a second gap pattern, and/or a UE-specific set of frequency bands associated with the UE and a UE-specific gap pattern and receiving, from the second network node, an updated gap configuration including an indication of an updated gap pattern of the first gap pattern for at least one of the first set of frequency bands, the second gap pattern for the second set of frequency bands, the UE-specific gap pattern for the UE-specific set of frequency bands, or any combination thereof.

An apparatus for wireless communications at a first network node in a wireless communications system is described. The apparatus may include a processor, memory in electronic communication with the processor, and instructions stored in the memory. The instructions may be executable by the processor to cause the apparatus to transmit, to a second network node in the wireless communications system, a first indication of a first set of frequency bands associated with a UE and a first gap pattern, a second indication of a second set of frequency bands associated with the UE and a second gap pattern, and/or a UE-specific set of frequency bands associated with the UE and a UE-specific gap pattern and receive, from the second network node, an updated gap configuration including an indication of an updated gap pattern of the first gap pattern for at least one of the first set of frequency bands, the second gap pattern for the second set of frequency bands, the UE-specific gap pattern for the UE-specific set of frequency bands, or any combination thereof.

Another apparatus for wireless communications at a first network node in a wireless communications system is described. The apparatus may include means for transmitting, to a second network node in the wireless communications system, a first indication of a first set of frequency bands associated with a UE and a first gap pattern, a second indication of a second set of frequency bands associated with the UE and a second gap pattern, and/or a UE-specific set of frequency bands associated with the UE and a UE-specific gap pattern and receiving, from the second network node, an updated gap configuration including an indication of an updated gap pattern of the first gap pattern for at least one of the first set of frequency bands, the second gap pattern for the second set of frequency bands, the UE-specific gap pattern for the UE-specific set of frequency bands, or any combination thereof.

A non-transitory computer-readable medium storing code for wireless communications at a first network node in a wireless communications system is described. The code may include instructions executable by a processor to transmit, to a second network node in the wireless communications system, a first indication of a first set of frequency bands associated with a UE and a first gap pattern, a second indication of a second set of frequency bands associated with the UE and a second gap pattern, and/or a UE-specific set of frequency bands associated with the UE and a UE-specific gap pattern and receive, from the second network node, an updated gap configuration including an indication of an updated gap pattern of the first gap pattern for at least one of the first set of frequency bands, the second gap pattern for the second set of frequency bands, the UE-specific gap pattern for the UE-specific set of frequency bands, or any combination thereof.

Some examples of the method, apparatuses, and non-transitory computer-readable medium described herein may further include operations, features, means, or instructions for identifying a modification for the first gap pattern, the second gap pattern, or the UE-specific gap pattern and transmitting a list of frequency bands measured by the UE based on the modification.

Some examples of the method, apparatuses, and non-transitory computer-readable medium described herein may further include operations, features, means, or instructions for receiving a gap type associated with the first set of frequency bands, the second set of frequency bands, or the UE-specific set of frequency bands based on the updated gap configuration.

Some examples of the method, apparatuses, and non-transitory computer-readable medium described herein may further include operations, features, means, or instructions for determining a new gap for at least one of the first set of frequency bands and the second set of frequency bands, transmitting, to the UE, a gap configuration indicating the new gap and transmitting a node message to the second network node indicating a UE configuration based on the new gap.

Some examples of the method, apparatuses, and non-transitory computer-readable medium described herein may further include operations, features, means, or instructions for transmitting, to the second network node, a list of frequency bands of the first and second sets of frequency bands associated with the new gap.

Some examples of the method, apparatuses, and non-transitory computer-readable medium described herein may further include operations, features, means, or instructions for receiving, from the second network node, a node message indicating a UE configuration having a modified gap for at least one of the first and second sets of frequency bands.

In some examples of the method, apparatuses, and non-transitory computer-readable medium described herein, the first network node may be one of a master network node and a secondary network node and the second network node may be the other of the master network node and the secondary network node.

In some examples of the method, apparatuses, and non-transitory computer-readable medium described herein, the master network node includes a new radio (NR) network node and the secondary network node includes a evolved universal terrestrial radio access network (EUTRAN) network node.

In some examples of the method, apparatuses, and non-transitory computer-readable medium described herein, the master network node and the secondary network node both include new radio (NR) network nodes.

In some examples of the method, apparatuses, and non-transitory computer-readable medium described herein, the first and second sets of frequency bands may be non-overlapping.

In some examples of the method, apparatuses, and non-transitory computer-readable medium described herein, the gap pattern includes a measurement gap configuration, a measurement gap sharing configuration, or any combination thereof.

In some examples of the method, apparatuses, and non-transitory computer-readable medium described herein, the first set of frequency bands include a set of sub 6 GHz frequencies and the second set of frequency bands include a set of frequency bands above 6 GHz.

A method of wireless communications at a first network node in a wireless communications system is described. The method may include identifying a gap pattern for a UE, the gap pattern associated with a first frequency band range or a second frequency band range non-overlapping with the first frequency band range, transmitting a gap configuration message to a second network node in the wireless communications system, the gap configuration message indicating a configuration of the gap pattern for the UE, and receiving, from the second network node, a set of frequency bands within the first frequency band range or the second frequency band range measured by the UE in response to the gap configuration message.

An apparatus for wireless communications at a first network node in a wireless communications system is described. The apparatus may include a processor, memory in electronic communication with the processor, and instructions stored in the memory. The instructions may be executable by the processor to cause the apparatus to identify a gap pattern for a UE, the gap pattern associated with a first frequency band range or a second frequency band range non-overlapping with the first frequency band range, transmit a gap configuration message to a second network node in the wireless communications system, the gap configuration message indicating a configuration of the gap pattern for the UE, and receive, from the second network node, a set of frequency bands within the first frequency band range or the second frequency band range measured by the UE in response to the gap configuration message.

Another apparatus for wireless communications at a first network node in a wireless communications system is described. The apparatus may include means for identifying a gap pattern for a UE, the gap pattern associated with a first frequency band range or a second frequency band range non-overlapping with the first frequency band range, transmitting a gap configuration message to a second network node in the wireless communications system, the gap configuration message indicating a configuration of the gap pattern for the UE, and receiving, from the second network node, a set of frequency bands within the first frequency band range or the second frequency band range measured by the UE in response to the gap configuration message.

A non-transitory computer-readable medium storing code for wireless communications at a first network node in a wireless communications system is described. The code may include instructions executable by a processor to identify a gap pattern for a UE, the gap pattern associated with a first frequency band range or a second frequency band range non-overlapping with the first frequency band range, transmit a gap configuration message to a second network node in the wireless communications system, the gap configuration message indicating a configuration of the gap pattern for the UE, and receive, from the second network node, a set of frequency bands within the first frequency band range or the second frequency band range measured by the UE in response to the gap configuration message.

Some examples of the method, apparatuses, and non-transitory computer-readable medium described herein may further include operations, features, means, or instructions for identifying gap patterns for the UE for both the first frequency band range and the second frequency band range, where the gap configuration message indicates the identified gap patterns.

Some examples of the method, apparatuses, and non-transitory computer-readable medium described herein may further include operations, features, means, or instructions for identifying the gap pattern for the UE for one of the first frequency band range or the second frequency band range and receiving, from the second network node, a gap pattern configuration for the other of the first frequency band range or the second frequency band range.

In some examples of the method, apparatuses, and non-transitory computer-readable medium described herein, the first network node may be one of a master network node and a secondary network node and the second network node may be the other of the master network node and the secondary network node.

In some examples of the method, apparatuses, and non-transitory computer-readable medium described herein, the master network node includes a new radio (NR) network node and the secondary network node includes an evolved universal terrestrial radio access network (EUTRAN) network node.

In some examples of the method, apparatuses, and non-transitory computer-readable medium described herein, the master network node and the secondary network node both include new radio (NR) network nodes.

In some examples of the method, apparatuses, and non-transitory computer-readable medium described herein, the gap pattern includes a measurement gap configuration, a measurement gap sharing configuration, or any combination thereof.

In some examples of the method, apparatuses, and non-transitory computer-readable medium described herein, the first frequency band range includes a sub 6 GHz frequency band range and the second frequency band includes a frequency band range in a range above 6 GHz.

A method of wireless communications at a master network node in a wireless communications system is described. The method may include transmitting, to a secondary network node in the wireless communications system, an indication of a set of millimeter wave (mmW) frequency bands associated with a UE and a mmW gap pattern, and receiving, from the secondary network node, an updated mmW gap configuration for the set of mmW frequency bands in response to the indication of the set of mmW frequency bands.

An apparatus for wireless communications at a master network node in a wireless communications system is described. The apparatus may include a processor, memory in electronic communication with the processor, and instructions stored in the memory. The instructions may be executable by the processor to cause the apparatus to transmit, to a secondary network node in the wireless communications system, an indication of a set of mmW frequency bands associated with a UE and a mmW gap pattern, and receive, from the secondary network node, an updated mmW gap configuration for the set of mmW frequency bands in response to the indication of the set of mmW frequency bands.

Another apparatus for wireless communications at a master network node in a wireless communications system is described. The apparatus may include means for transmitting, to a secondary network node in the wireless communications system, an indication of a set of mmW frequency bands associated with a UE and a mmW gap pattern, and means for receiving, from the secondary network node, an updated mmW gap configuration for the set of mmW frequency bands in response to the indication of the set of mmW frequency bands.

A non-transitory computer-readable medium storing code for wireless communications at a master network node in a wireless communications system is described. The code may include instructions executable by a processor to transmit, to a secondary network node in the wireless communications system, an indication of a set of mmW frequency bands associated with a UE and a mmW gap pattern, and receive, from the secondary network node, an updated mmW gap configuration for the set of mmW frequency bands in response to the indication of the set of mmW frequency bands.

A method of wireless communications at a secondary network node in a wireless communications system is described. The method may include receiving, from a master network node in the wireless communications system, an indication of a set of mmW frequency bands associated with a UE and a mmW gap pattern, updating a gap pattern for the set of mmW frequency bands, and transmitting, to the master network node, an updated gap configuration including an indication of the updated gap pattern.

An apparatus for wireless communications at a secondary network node in a wireless communications system is described. The apparatus may include a processor, memory in electronic communication with the processor, and instructions stored in the memory. The instructions may be executable by the processor to cause the apparatus to receive, from a master network node in the wireless communications system, an indication of a set of mmW frequency bands associated with a UE and a mmW gap pattern, update a gap pattern for the set of mmW frequency bands, and transmit, to the master network node, an updated gap configuration including an indication of the updated gap pattern.

Another apparatus for wireless communications at a secondary network node in a wireless communications system is described. The apparatus may include means for receiving, from a master network node in the wireless communications system, an indication of a set of mmW frequency bands associated with a UE and a mmW gap pattern, means for updating a gap pattern for the set of mmW frequency bands, and means for transmitting, to the master network node, an updated gap configuration including an indication of the updated gap pattern.

A non-transitory computer-readable medium storing code for wireless communications at a secondary network node in a wireless communications system is described. The code may include instructions executable by a processor to receive, from a master network node in the wireless communications system, an indication of a set of mmW frequency bands associated with a UE and a mmW gap pattern, update a gap pattern for the set of mmW frequency bands, and transmit, to the master network node, an updated gap configuration including an indication of the updated gap pattern.

DETAILED DESCRIPTION

Figure 1:
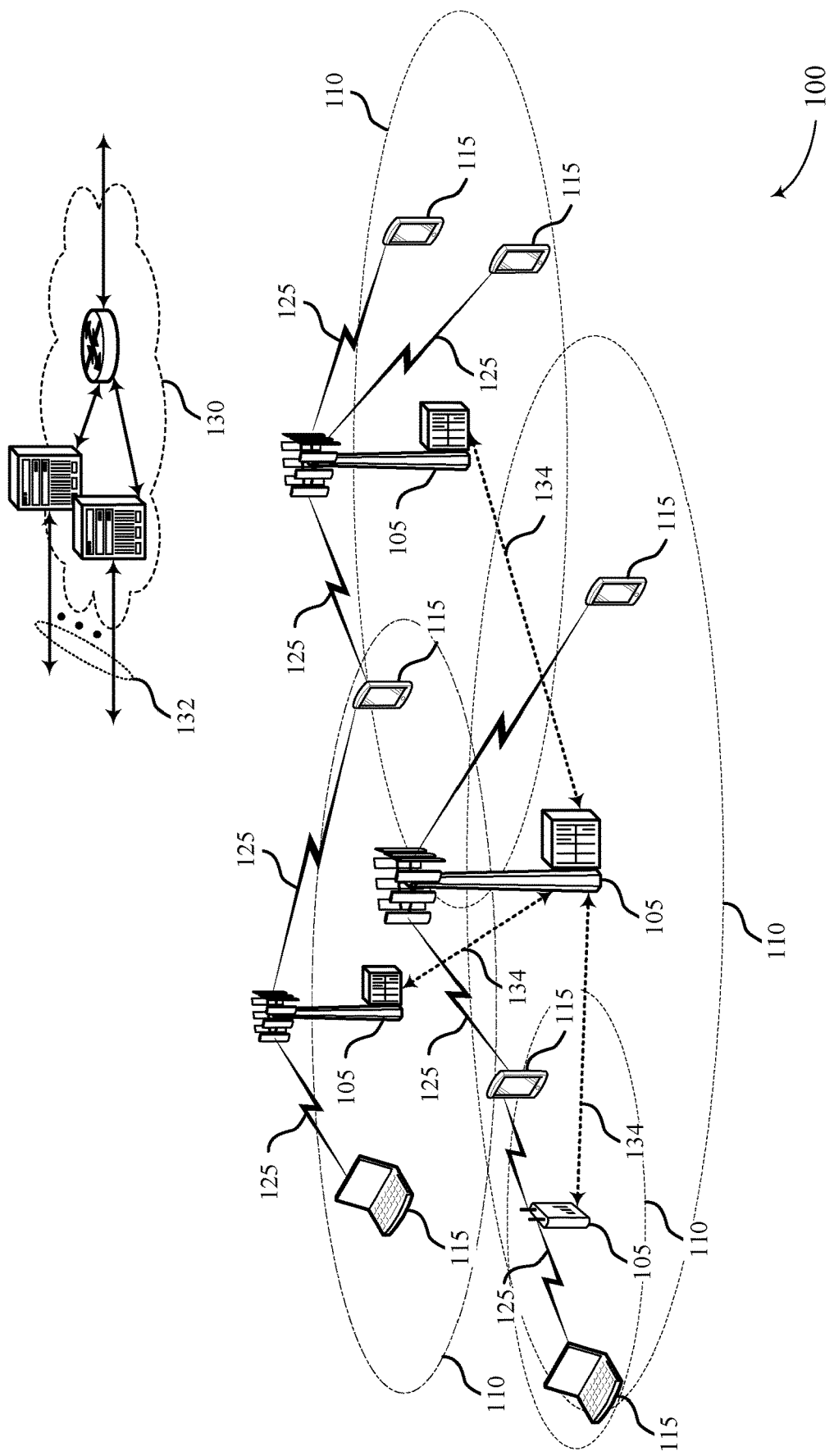
FIG. 1 illustrates an example of a wireless communications system that supports measurement gap configuration and coordination in accordance with aspects of the present disclosure.

A user equipment (UE) may operate in a dual connectivity mode (e.g., Evolved Universal Terrestrial Radio Access (E-UTRA) New Radio (NR) dual connectivity (EN-DC)) in which a master node (MN) (e.g., a base station or other network device) transmits information to the UE in a first frequency band range and a secondary node (SN) (e.g., a base station or other network device) transmits to the UE in a second frequency band range. Both frequency band ranges may be associated with respective measurement gap patterns which may be modified by the MN and/or SN (e.g., in accordance with the frequency band range used by each node for transmission to the UE). For instance, the MN may modify a measurement gap pattern for a first frequency band (e.g., FR1) and the SN may modify a measurement gap pattern for a second frequency band (e.g., FR2). In some examples, FR1 and FR2 may refer to non-overlapping frequency band ranges (e.g., FR1 may refer to a sub 6 GHz band and FR2 may refer to a band that is above 6 GHZ).

A node that is not configured to modify a measurement gap pattern within a particular frequency band range (e.g., the SN within FR1) may transmit a message to a node with the capability to modify the measurement gap pattern. The message may include a request to modify the measurement gap pattern (e.g., the SN may request the MN to modify a measurement gap pattern associated with FR1). Such a request may involve transmission of a list of frequency bands or frequency bands corresponding to the frequency band range of interest from a non-configured node to a configured node. The configured node may modify the measurement gap pattern of the frequency band range of interest. In some cases (e.g., if the SN is requesting the MN to modify a measurement gap pattern), the configured node may choose to transmit an indication of the updated measurement gap pattern to the non-configured node.

According to some aspects, the MN may lack a capability to communicate in a given frequency band (e.g., the MN may be unable to communicate in a millimeter wave (mmW) band (e.g., FR2)). In such cases, the MN may be configured to operate in FR1 or another frequency band (e.g., a long term evolution (LTE) frequency band) and the secondary node may be configured to operate in FR2. As such, measurement gap pattern modification requests sent to the MN may be directed towards modifying LTE or FR1 measurement gap patterns and measurement gap pattern modification requests sent to the SN may be directed towards modifying FR2 measurement gap patterns. Further, if the MN lacks a capability to communicate in FR2, gap pattern modification requests sent to the SN by an MN may not receive an indication of an updated measurement gap pattern from the SN (e.g., as the MN may not use such information to perform scheduling).

In other cases, the MN may have a capability to transmit in FR1 and FR2. In such cases, a UE may operate in NR-NR dual connectivity (NR-DC) (e.g., both the MN and the SN are NR nodes) or NR E-UTRA dual connectivity (NE-DC) (e.g., the MN is a NR node and the SN is an E-UTRAN node). In some cases, the MN may configure measurement gap patterns for all of the relevant frequency band ranges (e.g., FR2, FR1, LTE, UE-specific). For instance, requests sent to the MN from an SN may be directed towards updating FR2 measurement gap patterns. Additionally or alternatively, the SN may configure FR2, but requests sent to the SN by a MN may receive an indication of an updated measurement gap pattern from the SN in response (e.g., as the MN may use such information to perform scheduling). Other combinations are also possible without deviating from the scope of the present disclosure. For instance, the SN may configure FR1 and FR2 measurement gap patterns and the MN may configure LTE and UE-specific measurement gap patterns.

If both the MN and the SN have a capability to transmit in FR1 and FR2, the MN and/or SN may choose fixed configuration roles. MN may decide to configure both FR1 gap and FR2 gap measurements. Alternatively, SN may decide to configure both FR1 and FR2 measurement gap patterns. In other examples, SN may choose to configure measurement gap patterns associated with one or more frequency bands (e.g., FR1 and FR2) and MN may configure the remaining frequency bands (e.g., LTE and UE-specific). In general, the configuration roles may be decided based on which node first configured a measurement gap pattern for a frequency band or whether one of the two nodes is already configured to configure a measurement gap pattern for the frequency band.

According to some aspects, the MN and SN may dynamically configure measurement gap patterns. For instance, the MN may configure a measurement gap pattern for a frequency band at a first time and, at a later time, the SN may configure a measurement gap pattern for the same frequency band.

Aspects of the disclosure are initially described in the context of wireless communications systems. Process flows and a decision flow are then provided to illustrate additional aspects of the disclosure. Aspects of the disclosure are further illustrated by and described with reference to apparatus diagrams, system diagrams, and flowcharts that relate to measurement gap configuration and coordination.

FIG. 1 illustrates an example of a wireless communications system 100 that supports measurement gap configuration and coordination in accordance with aspects of the present disclosure. The wireless communications system 100 includes base stations 105, UEs 115, and a core network 130. In some examples, the wireless communications system 100 may be an LTE network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrow band Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrow band communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHZ.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrow band protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support efficient techniques for measurement gap configuration and coordination. For example, a network node (e.g., a base station 105) may receive, from another network node (e.g., another base station 105), a first set of frequency bands (e.g., above 6 GHZ) associated with a UE 115 and a first gap pattern, a second set of frequency bands (e.g., below 6 GHZ) associated with the UE 115 and a second gap pattern, and/or a UE-specific set of frequency bands associated with the UE 115 and a UE-specific gap pattern. The network node may update a gap pattern for at least one of the sets of frequency bands and may transmit an updated gap configuration that indicates the updated gap pattern to the other node.

As another example, a network node (e.g., a base station 105) may identify a gap pattern for a UE 115 that is associated with a first frequency band range non-overlapping with the first frequency band range. The network node may transmit a gap configuration message to another network node (e.g., another base station 105) indicating a gap pattern configuration for the UE. The network node may receive, from the other network node, a set of frequency bands measured by the UE 115 within the first frequency band range or the second frequency band range measured by the UE in response to the gap configuration message.

Figure 2:
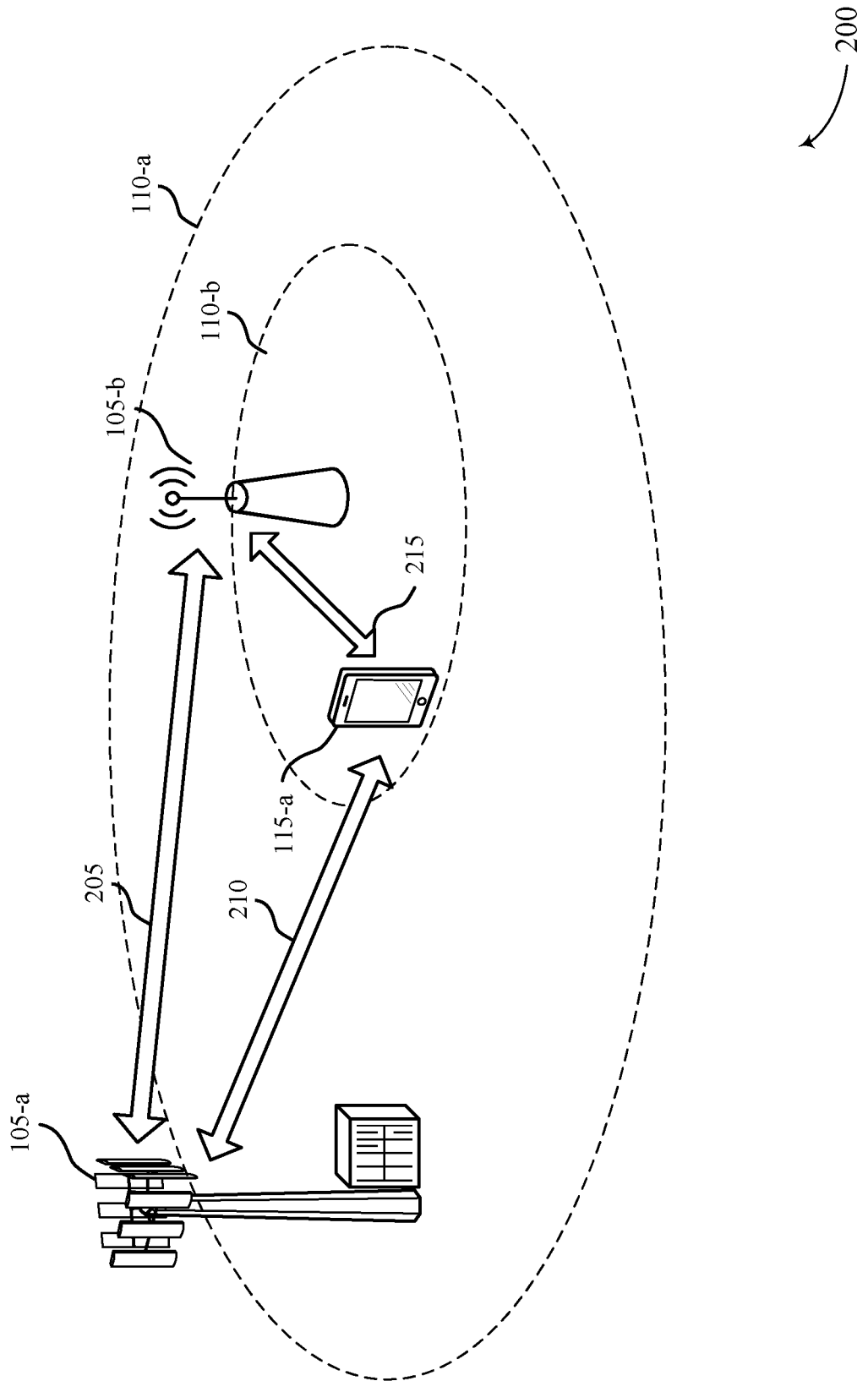
FIG. 2 illustrates an example of a wireless communications system that supports measurement gap configuration and coordination in accordance with aspects of the present disclosure.

FIG. 2 illustrates an example of a wireless communications system 200 that supports measurement gap configuration and coordination in accordance with aspects of the present disclosure. In some examples, wireless communications system 200 may implement aspects of wireless communications system 100. Wireless communications system 200 may include a base station 105-a and a base station 105-b, which may be examples of base stations 105 as described with reference to FIG. 1.

In some cases, a UE 115-a may communicate concurrently with both base station 105-a and base station 105-b. For instance, UE 115-a may operate according to EN-DC. In such cases, UE 115-a may communicate with base station 105-a in a first bandwidth (e.g., an LTE or sub 6 GHz bandwidth) over a communication link 210 and communicate with base station 105-b in a second bandwidth (e.g., a mmW bandwidth or bandwidth part (BWP)) over a communication link 215. In some examples, base station 105-a may be referred to as a master node (MN) and base station 105-b may be referred to as a secondary node (SN). In some cases, the coverage area 110-a of the base station 105-a may be less than the coverage area 110-b of the base station 105-b, but both coverage areas may support communication for UE 115-a.

Each bandwidth or BWP of communications links 205, 210, or 215 may have measurement gap patterns containing time periods where information (e.g., data or control information) is not transmitted or received. These time period may be referred to as gaps. Such measurement gaps may be employed to enable UE 115-a to perform signal measurements when not attempting to transmit or receive data or control information. Measurement gaps may further aid UE 115-a when base stations 105 are operating within different bandwidths (e.g., if base station 105-a is communicating with the UE 115-a in a sub 6 GHz bandwidth and base station 105-b is communicating with the UE 115-a in a mmW bandwidth). A table of gap pattern configurations is shown in Table 1 below.

TABLE 1

Gap Pattern Configurations

| Gap Pattern ID | Measurement Gap Length (MGL, ms) | Measurement Gap Repetition Period (MGRP, ms) |
| --- | --- | --- |
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |

Each row of Table 1 may represent a particular gap pattern. Each gap pattern may be associated with a corresponding gap pattern identifier (ID), which may further correspond to a particular measurement gap length (MGL) and/or a particular measurement gap repetition period (MGRP). MGL may indicate a length of each gap and MGRP may indicate how often a gap is repeated. The gap pattern ID may be chosen based on the bandwidth each base station 105 uses for communication. For instance, if base station 105-a is communicating using an LTE bandwidth, base station 105-a may use gap pattern IDs 0 through 3. If base station 105-a is communicating using a first frequency band range (FR1) (e.g., sub 6 GHz bandwidth), base station 105-a may use gap pattern IDs 4 through 11. If base station 105-a is communicating using second frequency band range (FR2) (e.g., mmW bandwidth), base station 105-a may use gap pattern IDs 12 to 23.

In EN-DC, measurement gap patterns may be decided according to a per-UE or per-frequency (per-FR) scheme. In the per-UE scheme, a single measurement gap pattern may be used for UE 115-a. In such cases, both base station 105-a and base station 105-b may be communicating with UE 115-*a* over the same type of frequency bands (e.g., LTE, FR1, or FR2) and may use the same measurement gap pattern ID (e.g., if both base station 105-*a* and base station 105-*b* are communicating via FR1, they may use the same measurement gap pattern ID). In the per-UE scheme, base station 105-*a* may configure the per-UE gap. In the per-FR scheme, multiple measurement gap patterns corresponding to different frequency bands may be used for UE 115-*a*. For instance, if base station 105-*a* is communicating via FR1 and base station 105-*b* is communicating via FR2, then the measurement gap associated with base station 105-*a* may be configured as a separate gap pattern ID (e.g., gap pattern ID 4-11) than the measurement gap associated with base station 105-*b* (e.g., gap pattern ID 12-23). In the per-FR scheme, base station 105-*a* may configure the FR1 and LTE measurement gap patterns and base station 105-*b* may configure the FR2 measurement gap pattern.

In some cases, base station 105-*b* may request base station 105-*a* to modify or add a measurement gap pattern configured by base station 105-*a* (e.g., via a communication link 205, which may be an X2 or Xn interface). For instance, if base station 105-*a* is associated with a FR1 measurement gap pattern, base station 105-*b* may transmit a list of base station 105-*b* configured FR1 frequencies measured by UE 115-*a* (e.g., a list of FR1 frequency bands that base station 105-*b* has indicated to UE 115-*a* for measurement purposes) to base station 105-*a*. After receiving the list, base station 105-*a* may determine a new measurement gap pattern for FR1 and transmit the updated configuration to base station 105-*b* (e.g., to be used for scheduling). Additionally or alternatively, base station 105-*a* may request base station 105-*b* to modify or add a measurement gap pattern configured by base station 105-*a* (e.g., via a communication link 205). For instance, if base station 105-*b* is associated with a measurement gap in FR2, base station 105-*a* may transmit a list of base station 105-*a* configured FR2 frequencies measured by UE 115-*a*. After receiving the list, base station 105-*a* may determine a new measurement gap pattern for FR2, but may not transmit the measurement gap pattern to base station 105-*a* (e.g., base station 105-*a* may have no master eNB (MeNB) deployment in FR2 frequencies in EN-DC, so base station 105-*a* may not be capable of using such information for scheduling). In such cases, synchronization signal (SS) block based radio resource management (RRM) measurement timing configuration (SMTC) may not be used as gap assistance info. For instance, SMTC may be frequency-specific and relatively static, so base station 105-*a* or base station 105-*b* may have carrier frequency to SMTC mapping via operations, administration, and management (OAM) (e.g., such a mapping may be preconfigured).

In some cases, the MN (e.g., base station 105-*a*) may not have MeNB deployment in FR2 frequencies. However, in other instances, base station 105-*a* may have a capability operate in FR2 (e.g., if base station 105-*a* is a gNB). If both base station 105-*a* and base station 105-*b* have a capability to operate in FR1 and FR2, it may be advantageous to configure FR2 at base station 105-*a*, which may promote forward compatibility (e.g., in the future, an increasing number of nodes may be NR nodes and there may be correspondingly more opportunities for a UE 115, such as UE 115-*a*, to communicate in NR-DC or NE-DC). Additionally, it may be advantageous for base station 105-*a* and base station 105-*b* to dynamically switch roles (e.g., base station 105-*a* may switch from configuring FR1 measurement gaps to configuring FR2 measurement gaps and base station 105-*b* may switch from configuring FR2 measurement gaps to configuring FR1 measurement gaps), as switching roles dynamically may minimalize latency.

In other cases, both base station 105-*a* may have a capability to transmit in FR2. In such cases, base station 105-*a* may, for instance, be configured to communicate with UE 115-*a* in FR2 and base station 105-*b* may be configured to communicate with the UE in FR1 or FR2 (e.g., NR-DC and NE-DC). In some cases, base station 105-*a* may configure all of the measurement gap patterns (e.g., FR2, FR1, LTE, per-UE). For instance, requests sent to base station 105-*a* from base station 105-*b* may be directed towards updating FR2 measurement gap patterns. An advantage of base station 105-*a* configuring all of the measurement gap patterns is that, by enabling base station 105-*a*, which may be an MN, to configure all of the measurement gap patterns, base station 105-*b*, which may be an SN, may not be responsible for configuring measurement gap patterns. As such, a single configuration procedure (e.g., rather than two procedures, such as in EN-DC) may be utilized. Additionally or alternatively, base station 105-*b* may still configure FR2, but requests sent to base station 105-*b* by base station 105-*a* may receive an indication of an updated measurement gap pattern from base station 105-*b* (e.g., as base station 105-*a* may use such information to perform scheduling). Other combinations are also possible without deviating from the scope of the present disclosure. For instance, base station 105-*b* may configure FR1 and FR2 measurement gap patterns and base station 105-*a* may configure LTE and per-UE measurement gap patterns. Although base station 105-*a* may communicate with UE 115-*a* in a particular bandwidth and configure measurement gap patterns for that same bandwidth, base station 105-*a* may also communicate with UE 115-*a* in a particular bandwidth (e.g., FR1) and configure a measurement gap pattern for a different bandwidth (e.g., FR2) that base station 105-*b* uses for communication with UE 115-*a*.

If both base station 105-*a* and base station 105-*b* have a capability to transmit in FR1 and FR2, base station 105-*a*, base station 105-*b*, or both may modify the measurement gap patterns. For instance, base station 105-*a* may decide to configure both the FR1 measurement gap pattern and the FR2 measurement gap pattern. Alternatively, base station 105-*b* may decide to configure both the FR1 measurement gap pattern and the FR2 measurement gap pattern. Alternatively, base station 105-*b* may configure measurement gap bandwidth patterns for one or more of a set of bandwidths (e.g., LTE, FR1, FR2) and base station 105-*a* may configure the rest. In such cases, initial latency may be minimalized. For example, if base station 105-*a* decides to configure FR1, base station 105-*a* may choose to do so immediately (e.g., base station 105-*a* may not wait until base station 105-*a* receives an indication from base station 105-*b*).

In other cases, both base station 105-*a* and base station 105-*b* may be able to modify measurement gap patterns for one or more of a set of bandwidths (e.g., LTE, FR1, and FR2). Allowing both base station 105-*a* and base station 105-*b* to modify or add measurement gap patterns associated with the same sets of bandwidths may reduce or minimize latency (e.g., latency may be reduced because base station 105-*b* may, for instance, not wait for a transmission from base station 105-*a* to configure a measurement gap pattern).

Figure 3A:
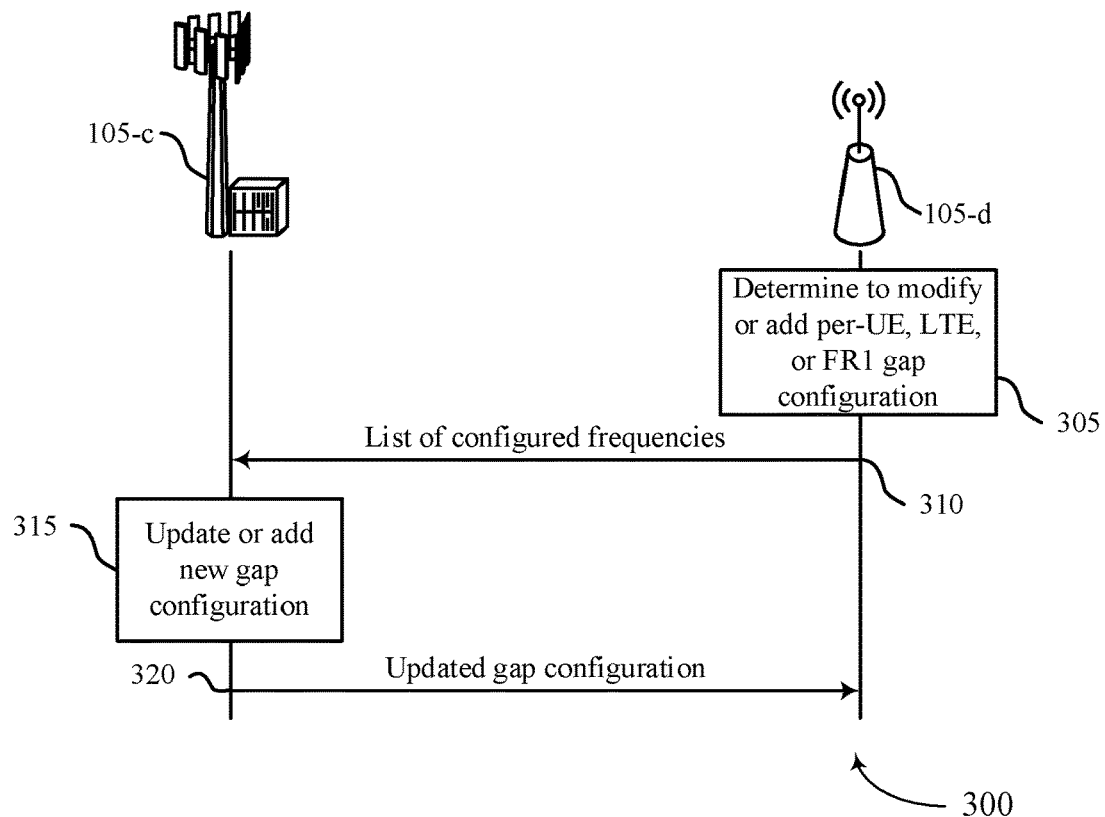
FIGS. 3A and 3B illustrate examples of process flows that support measurement gap configuration and coordination in accordance with aspects of the present disclosure.
Figure 3B:
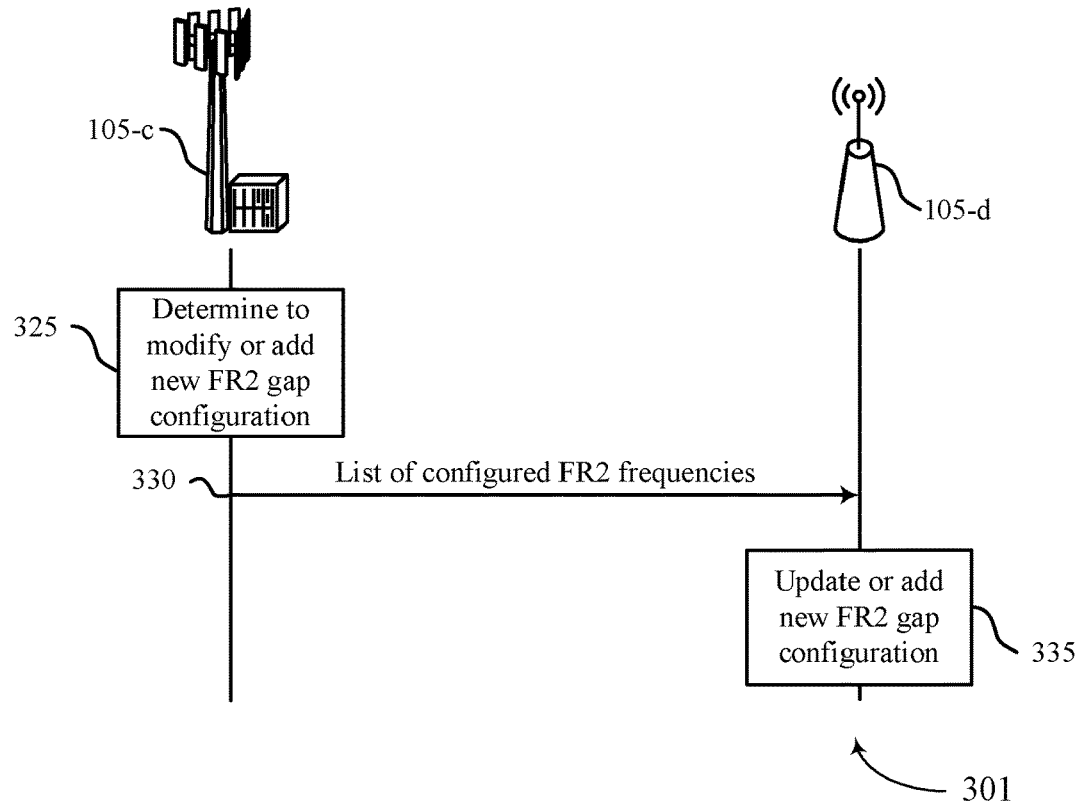

FIGS. 3A and 3B illustrate example process flows 300 and 301 that support measurement gap configuration and coordination in accordance with aspects of the present disclosure. In some examples, process flows 300 and 301 may implement aspects of wireless communications systems 100 or 200. Process flows 300 and 301 may include a base station 105-c and a base station 105-d, which may be examples of base stations as described with reference to FIGS. 1 and 2.

In process flow 300, base station 105-c may be in communication with base station 105-d (e.g., via an X2 or Xn interface). Base station 105-c may represent an MN and base station 105-d may represent an SN. In some cases, base station 105-c may not have MeNB deployment (e.g., base station 105-c may be an eNB) and may not be able to operate in FR2. In other cases, base station 105-c may be able to operate in FR2 (e.g., base station 105-c may be a gNB).

At 305, base station 105-d may determine to request base station 105-c to modify (or add) a per-UE, LTE, or FR1 gap configuration.

At 310, base station 105-d may transmit a list or set of frequency bands (e.g., LTE or FR1 frequencies) configured by base station 105-d to base station 105-c. The list may be contained within a parameter (e.g., measuredFrequenciesSN) of a message directed to base station 105-c (e.g., a CG-Config message). In some cases, the list may contain frequencies associated with multiple frequency band ranges (e.g., some frequencies may be within FR1 and some frequencies may be within LTE).

At 315, base station 105-c, based on the list of base station 105-d configured frequencies, may determine one or more updated or new per-UE, LTE, or FR1 measurement gap patterns.

At 320, base station 105-c may transmit one or more updated gap configurations to base station 105-d which may indicate the one or more updated gap patterns. Each gap pattern may be indicated by a measurement gap configuration parameter (e.g., measGapConfig) and/or a gap purpose parameter (e.g., gapPurpose) included in a message directed to base station 105-d (e.g., a CG-ConfigInfo message). In some cases, the gap purpose parameter may indicate whether base station 105-c is operating in a per-UE or per-FR mode.

In process flow 301, base station 105-c may be in communication with base station 105-d (e.g., via an X2 or Xn interface). Base station 105-c may represent an MN and base station 105-d may represent an SN. In some cases, base station 105-c may not have MeNB deployment (e.g., base station 105-c may be an eNB) and may not be able to operate in FR2. In other cases, base station 105-c may be able to operate in FR2 (e.g., base station 105-c may be a gNB).

At 325, e.g., base station 105-c may determine to request base station 105-d to update (or add) a FR2 gap configuration.

At 330, base station 105-c may transmit a list or set of frequency bands (e.g., FR2 frequencies) configured by base station 105-c to base station 105-d. The list may be contained within a list parameter (e.g., measuredFrequenciesMN) of a message directed to base station 105-d (e.g., a CG-ConfigInfo message).

At 335, base station 105-d may determine, based on the list of base station 105-d configured frequencies, one or more new or updated FR2 measurement gap configurations.

In some cases, base station 105-d may not have a capability to operate in FR2 (e.g., base station 105-d may be an eNB) and base station 105-c may have a capability to operate in FR2 (e.g., base station 105-c may be a gNB). In such cases, base station 105-d, which may be acting as an SN, may update FR1 measurement gap configurations according to process flow 301 with modifications. For instance, instead of transmitting a list of base station 105-c configured FR2 frequencies, base station 105-c may transmit a list of base station 105-c configured FR1 frequencies. Further, after determining a new FR1 measurement gap configuration, base station 105-d may transmit the updated configuration (e.g., in a CG-Config message). Further base station 105-c, which may be acting as an MN, may updated FR2 measurement gap configurations according to process flow 300 with modifications. For instance, instead of transmitting a list of base station 105-d configured FR1 frequencies, base station 105-d may transmit a list of base station 105-d configured FR2 frequencies. Further, after determining a new FR2 measurement gap configuration, base station 105-c may or may not transmit an updated measurement gap configuration (e.g., within a (G-ConfigInfo message) to base station 105-d.

Figure 4:
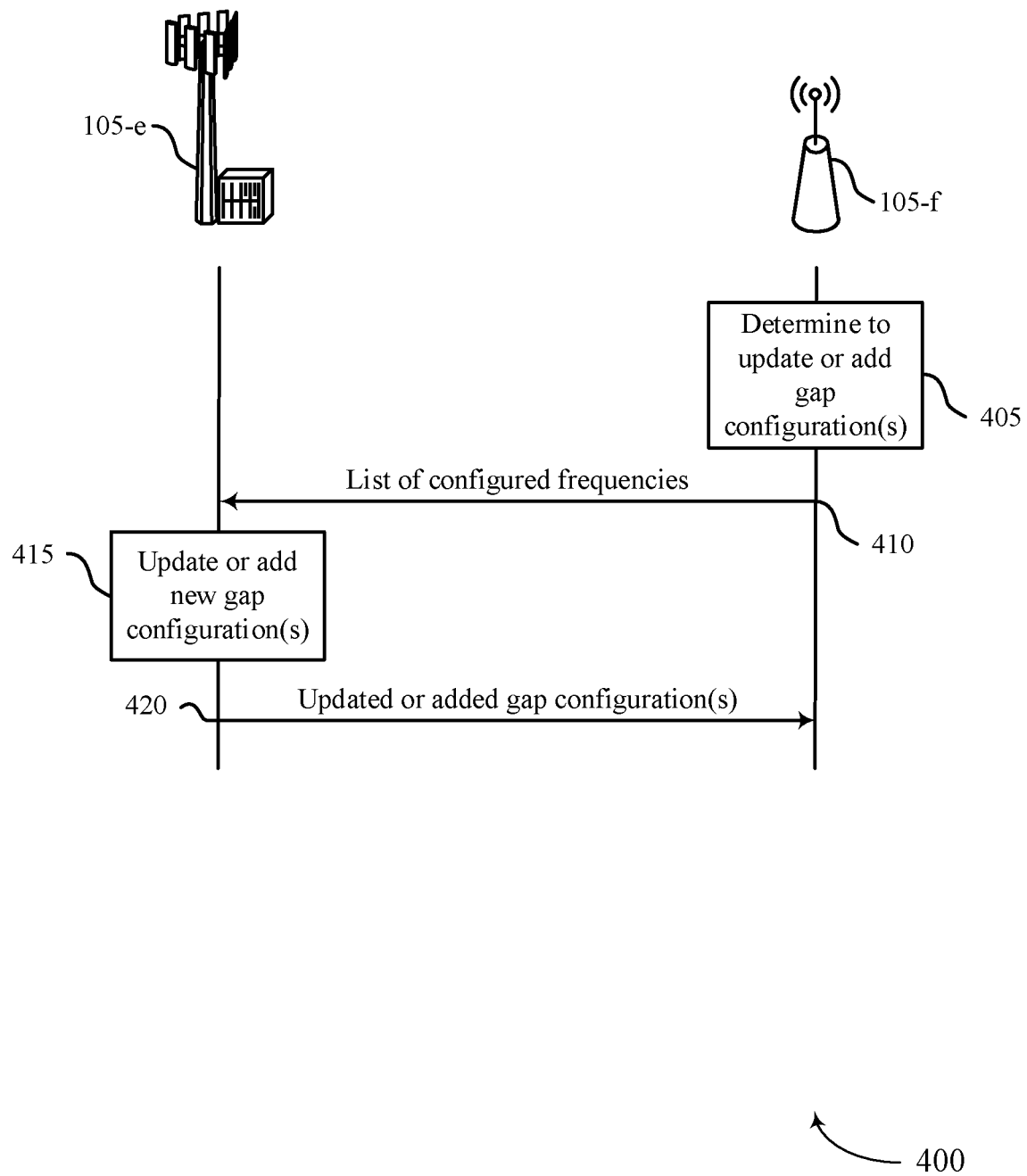
FIG. 4 illustrates an example of a process flow that supports measurement gap configuration and coordination in accordance with aspects of the present disclosure.

FIG. 4 illustrates an example of a process flow 400 that supports measurement gap configuration and coordination in accordance with aspects of the present disclosure. In some examples, process flow 400 may implement aspects of wireless communications systems 100 or 200. Process flow 400 may include a base station 105-e and a base station 105-f, which may be examples of base stations 105 as described with reference to FIG. 1 or 2. Base station 105-e may be in communication with base station 105-f (e.g., via an X2 or Xn interface). Base station 105-e may represent an MN and base station 105-f may represent an SN. Both base station 105-e and 105-f may have a capability to operate in FR1 and FR2 (e.g., both may be gNBs).

At 405, base station 105-f may determine to request base station 105-e to update (or add) a per-UE, LTE, FR1, or FR2 measurement gap configuration. For instance, if base station 105-e is configured to update a FR2 measurement gap pattern, base station 105-f may determine to request base station 105-e to update FR2 measurement gap pattern. Alternatively, if base station 105-e is configured to update a FR1 measurement gap pattern, base station 105-f may determine to request base station 105-e to modify FR1 measurement gap configuration.

At 410, base station 105-f may transmit a list or set of frequency bands (e.g., UE-specific, LTE, FR1 or FR2 frequencies) configured by base station 105-f to base station 105-e. The list may be contained within a parameter (e.g., measuredFrequenciesSN) of a message directed to base station 105-e (e.g., a CG-Config message). In some cases, the list may contain frequencies associated with multiple frequency band ranges (e.g., some frequencies may be within FR1 and some frequencies may be within FR2).

At 415, base station 105-e, based on the list of base station 105-f configured frequencies, may determine one or more updated or new per-UE, LTE, FR1, or FR2 measurement gap patterns. If base station 105-e is configured to update the FR2 measurement pattern, base station 105-e may determine an updated FR2 measurement gap pattern based on the list of frequency bands configured by base station 105-f. Additionally or alternatively, if base station 105-e is configured to update the FR1 measurement gap pattern, base station 105-e may determine an updated FR1 measurement gap configuration.

At 420, base station 105-e may transmit one or more updated and/or new gap configurations to base station 105-f (e.g., a FR1 measurement gap configuration if base station 105-e is configured to update the FR1 measurement gap configuration and/or a FR2 measurement gap configuration if base station 105-e is configured to update the FR2 measurement gap configuration). The measurement gap configuration may be indicated by parameters (e.g., measGapConfig and/or gapPurpose) included in a message directed to base station 105-f (e.g., a CG-ConfigInfo message) and may indicate an updated or new measurement pattern gap.

Figure 5:
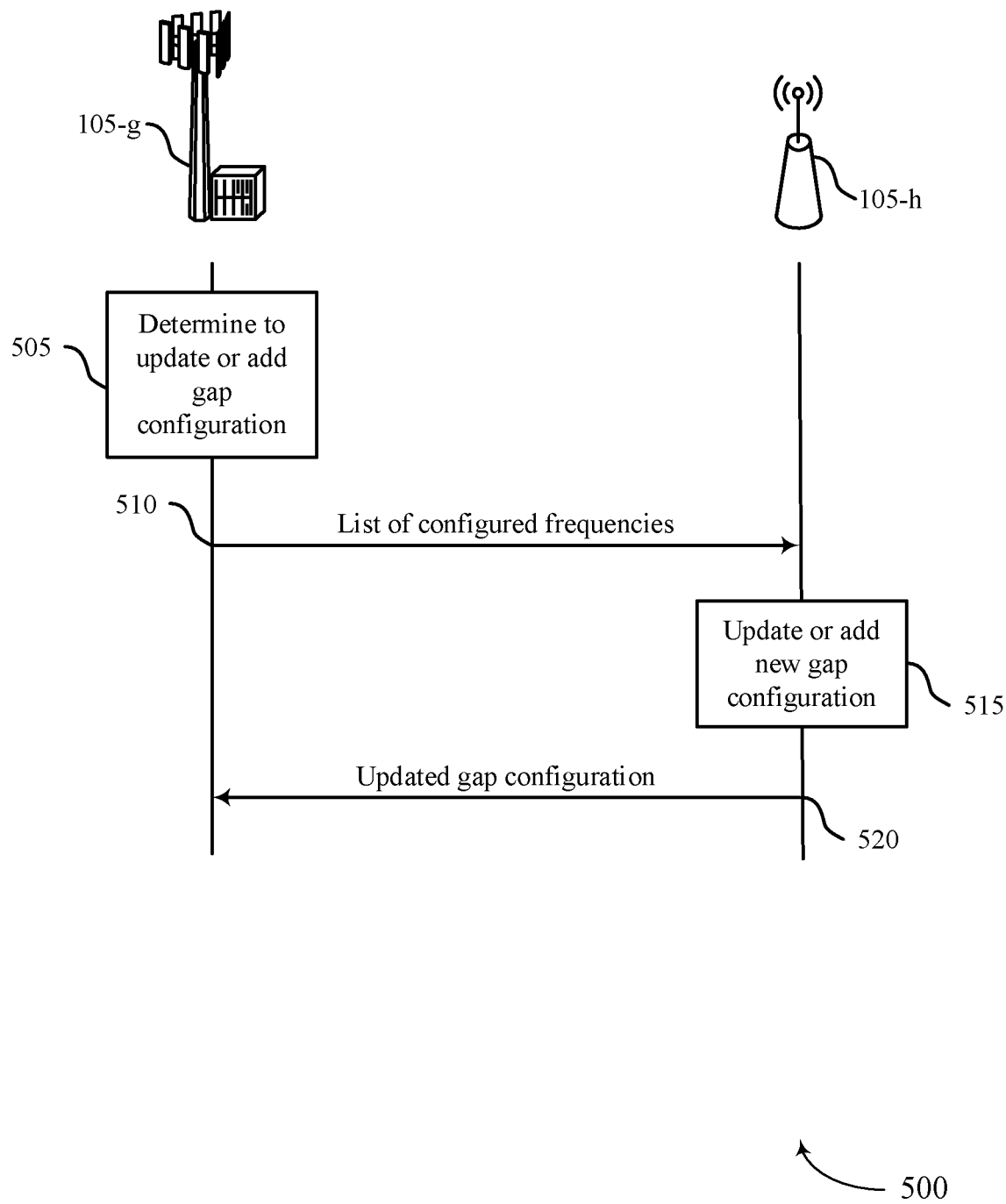
FIG. 5 illustrates an example of a process flow that supports measurement gap configuration and coordination in accordance with aspects of the present disclosure.

FIG. 5 illustrates an example of a process flow 500 that supports measurement gap configuration and coordination in accordance with aspects of the present disclosure. In some examples, process flow 500 may implement aspects of wireless communications systems 100 or 200. Process flow 500 may include a base station 105-g and a base station 105-h, which may be examples of base stations 105 as described with reference to FIGS. 1 and 2. Base station 105-g may be in communication with base station 105-h (e.g., via an X2 or Xn interface). Base station 105-g may represent an MN and base station 105-h may represent an SN. Both base station 105-g and 105-h may have a capability to operate in FR1 and FR2 (e.g., both may be gNBs). Base station 105-g may modify per-UE, LTE, and FR1 according to the techniques described in process flow 300.

At 505, the base station 105-g may determine to request base station 105-h to modify (or add) a FR2 measurement gap configuration.

At 510, base station 105-g may transmit a list or set of frequency bands (e.g., FR2 frequencies) configured by base station 105-g to base station 105-h. The list may be contained within a list parameter (e.g., measuredFrequenciesMN) included in a message directed to the SN (e.g., a CG-ConfigInfo message).

At 515, base station 105-h may, based on the list of FR2 frequencies, determine an updated or new FR2 measurement gap configuration.

At 520, base station 105-h may transmit an updated or new measurement gap configuration to base station 105-g to indicate the updated or new measurement gap. The measurement gap configuration may be indicated by parameters (e.g., measGapConfig) included in a message directed to base station 105-h (e.g., a CG-Config message).

Figure 6:
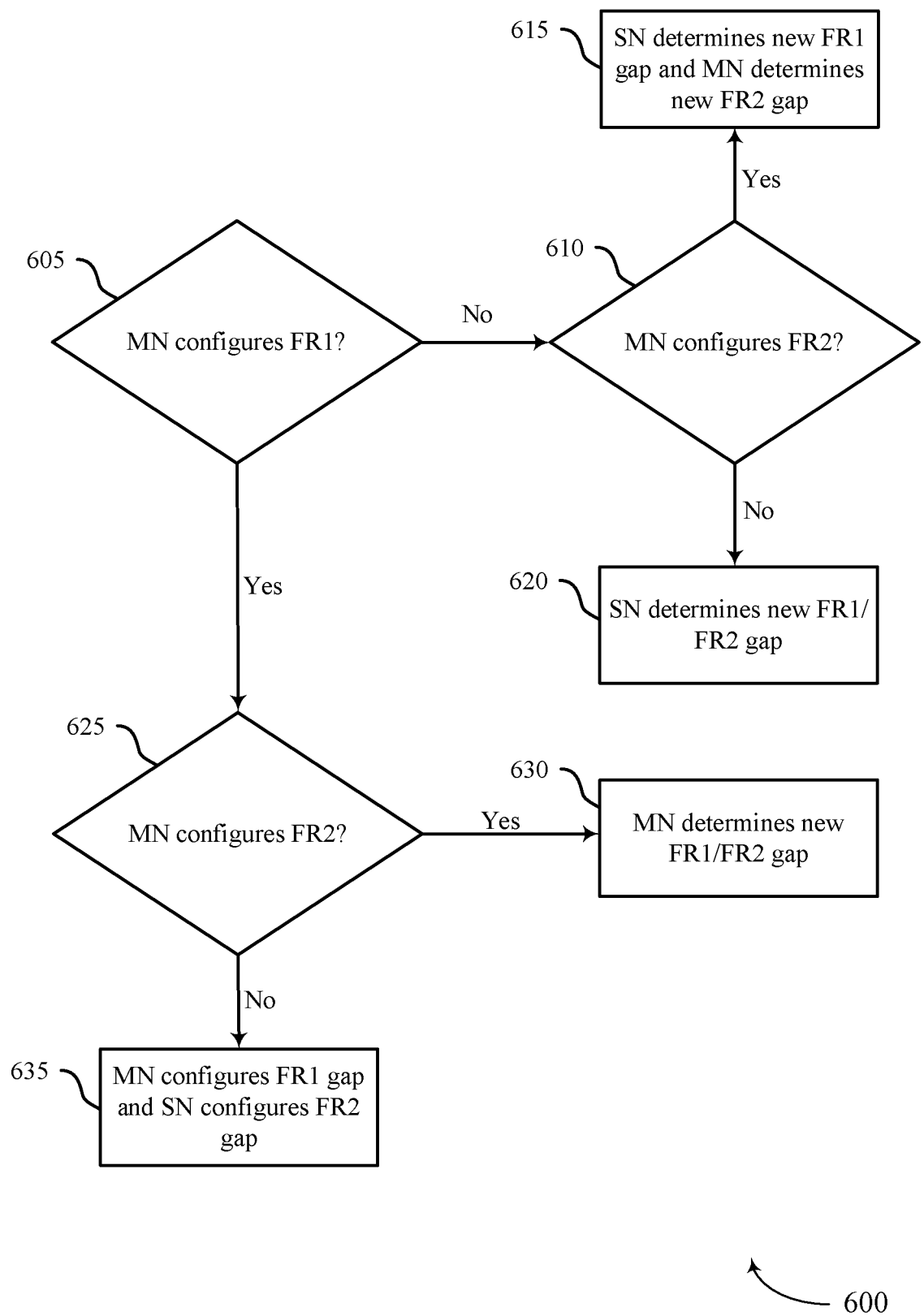
FIG. 6 illustrates an example of a decision flow that supports measurement gap configuration and coordination in accordance with aspects of the present disclosure.

FIG. 6 illustrates an example of a decision flow 600 that supports measurement gap configuration and coordination in accordance with aspects of the present disclosure. In some examples, decision flow 600 may implement aspects of wireless communications systems 100 or 200. In some examples, decision flow may be implemented by an MN and SN, which, in some cases, may be examples of base stations 105 as described in FIG. 1 or 2.

In some cases, an MN and/or an SN may decide whether the MN, the SN or both modify measurement gap patterns. Such a decision may be made based on whether the MN or SN are the first to configure a particular bandwidth or are already configuring the particular bandwidth. In the former case, the MN or SN may determine to configure a FR1 or FR2 measurement gap configuration and transmit an indication (e.g., an updated measurement gap configuration) to the other node. This action may indicate to the other node that the MN or SN is to configure the FR1 or FR2 measurement gap configuration in the future. For instance, at a first time, the MN may configure FR2 and transmit an indication of the updated configuration to SN. From then on out, MN may continue to configure FR2. At a later time, SN may configure FR1 and transmit an indication of the updated configuration to MN. From then on out, SN may continue to configure FR1. In such cases, the roles may be fixed as long as the UE is in contact with both the MN and the SN. In all such cases, per-UE gap may always be configured by the MN.

For instance, at 605, it may be determined if the MN configured a FR1 measurement gap configuration first or is already configured to configure a FR1 measurement gap configuration.

At 610, if the MN has not already configured a FR1 measurement gap configuration and/or has not configure a FR1 measurement gap configuration first, it may be determined whether MN configured a FR2 measurement gap configuration first or has already been configured to configure a FR2 measurement gap configuration. If so, the scheme of 615 may be chosen and the MN may determine the FR1 measurement gap configuration and the SN may determine the FR2 measurement gap configuration, respectively, utilizing the techniques of FIG. 3A and FIG. 3B, respectively. If not, the scheme of 620 may be chosen and the SN may determine FR1 measurement gap configurations and FR2 measurement gap configurations utilizing the techniques of FIG. 5 with modifications. Instead of a FR1 measurement gap configuration being configured according to the techniques described in process flow 300, a FR1 measurement gap configuration may be configured in a similar manner to the FR2 measurement gap configuration of FIG. 5. For instance, the MN may transmit a list of MN-configured FR1 frequencies measured by a UE 115 to the SN followed by the SN determining a new FR1 measurement gap configuration and indicating the updated FR1 configuration to the MN.

At 615, the SN may determine future FR1 measurement gap configurations and the MN may determine future FR2 measurement gap configurations. The scheme of 615 may be chosen based on the MN not already being configured to configure or not being the first to configure a FR1 measurement gap configuration. The scheme of 615 may be chosen, additionally or alternatively, based on the MN already being configured to configure or being the first to configure a FR2 measurement gap configuration. The scheme of 615 may be chosen, additionally or alternatively, based on the SN already being configured to configure or being the first to configure a FR1 measurement gap configuration. The scheme of 615 may be chosen, additionally or alternatively, based on the SN not already being configured to configure or not being the first to configure a FR2 measurement gap configuration. Although the present example relies on only the first two of these four possibilities, it should be noted that any other combinations of the four possibilities may be used.

At 620, the SN may determine future FR1 and future FR2 measurement gap configurations. The scheme of 620 may be chosen based on the MN not already being configured to configure or not being the first to configure a FR1 measurement gap configuration. The scheme of 620 may be chosen, additionally or alternatively, based on the MN not already being configured to configure or not being the first to configure a FR2 measurement gap configuration. The scheme of 620 may be chosen, additionally or alternatively, based on the SN already being configured to configure or being the first to configure a FR1 measurement gap configuration. The scheme of 620 may be chosen, additionally or alternatively, based on the SN already being configured to configure or being the first to configure a FR2 measurement gap configuration. Although the present example relies on only the first two of these four possibilities, it should be noted that any other combinations of the four possibilities may be used.

At 625, if the MN has already configured a FR1 measurement gap configuration or configured a FR1 measurement gap configuration first, it may be determined whether the MN configured a FR2 measurement gap configuration first or has already been configured to configure a FR2 measurement gap configuration. If so, the scheme of 630) may be chosen, and the MN may determine the FR1 measurement gap configuration and FR2 measurement gap configuration utilizing the techniques of FIG. 4. If not, the scheme of 635 may be chosen, and the MN may determine the FR1 measurement gap configuration and the SN may determine the FR2 measurement gap configuration according to the techniques of FIG. 4 and FIG. 5 with modifications. For instance, per-UE, legacy LTE, and FR2 measurement gap configurations may still be configured according to the techniques described in process flow 400. However a FR1 measurement gap configuration may be configured in a similar manner to the FR2 measurement gap configuration of FIG. 5. For instance, the MN may transmit a list of MN-configured FR1 frequencies measured by a UE 115 to the SN followed by the SN determining a new FR1 measurement gap configuration and indicating the updated FR1 configuration to the MN.

At 630, the MN may determine future FR1 measurement gap configurations and FR2 measurement gap configurations. The scheme of 630 may be chosen based on the MN already being configured to configure or being the first to configure a FR1 measurement gap configuration. The scheme of 630 may be chosen, additionally or alternatively, based on the MN already being configured to configure or being the first to configure a FR2 measurement gap configuration. The scheme of 630 may be chosen, additionally or alternatively, based on the SN not already being configured to configure and/or not being the first to configure a FR1 measurement gap configuration. The scheme of 630 may be chosen, additionally or alternatively, based on the SN not already being configured to configure and/or not being the first to configure a FR2 measurement gap configuration. Although the present example relies on only the first two of these four possibilities, it should be noted that any other combinations of the four possibilities may be used.

At 635, the MN may determine future FR1 measurement gap configurations and the SN may determine future FR2 measurement gap configurations (e.g., based on the MN already being configured or being the first to configure a FR1 measurement gap configuration, the MN not already being configured or not being the first to configure a FR2 measurement gap configuration, the SN not already being configured or not being the first to configure a FR1 measurement gap configuration, the SN already being configured or being the first to configure a FR2 measurement gap configuration). Although the present example describes only the first two of these possibilities, it should be noted that any other combinations of these possibilities or other options may be considered.

Figure 7A:
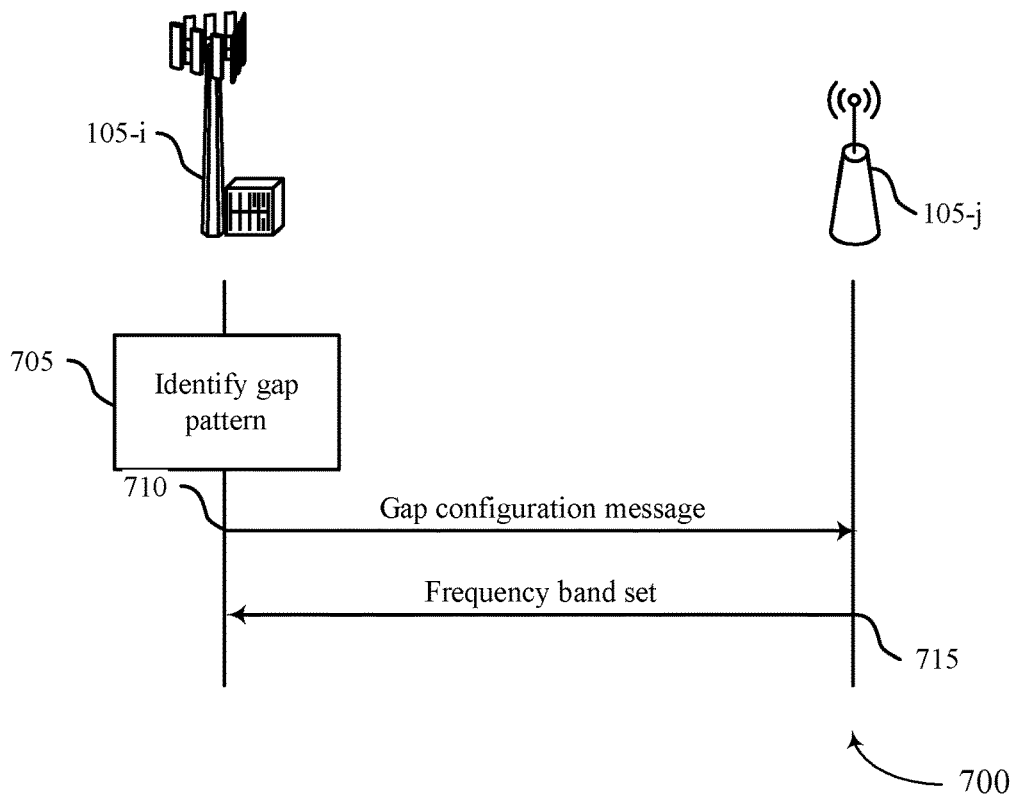
FIGS. 7A and 7B illustrate examples of process flows that support measurement gap configuration and coordination in accordance with aspects of the present disclosure.
Figure 7B:
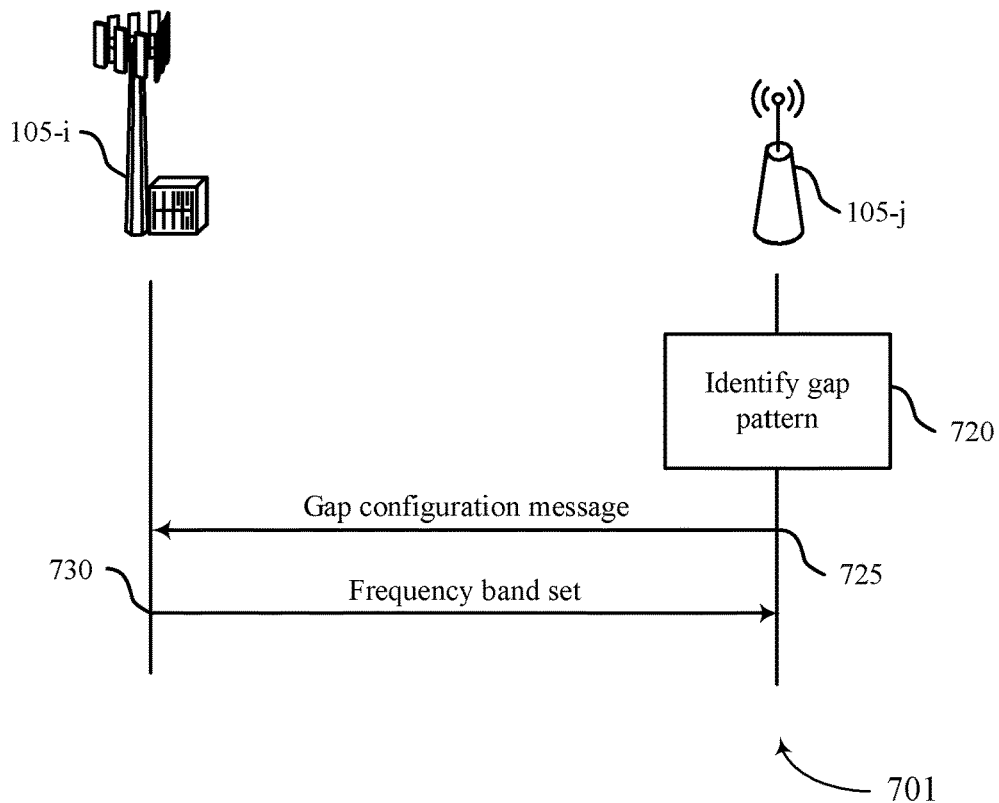

FIGS. 7A and 7B illustrate examples of process flows 700 and 701 that support measurement gap configuration and coordination in accordance with aspects of the present disclosure. In some examples, process flows 700 and 701 may implement aspects of wireless communications systems 100 or 200. Process flows 700 and 701 may include a base station 105-*i* and a base station 105-*j*, which may be examples of base stations 105 as described with reference to FIG. 1 or 2.

In process flow 700, base station 105-*i* may be in communication with base station 105-*j* (e.g., via an X2 or Xn interface). Base station 105-*c* may represent a MN and base station 105-*d* may represent an SN. In such cases, per-UE measurement gap configurations may be configured by only the MN, only the SN, or both.

At 705, base station 105-*i* may identify a gap pattern for a UE 115. In some cases, the gap pattern may be associated with a first frequency band range (e.g., FR1) or a second frequency band range (e.g., FR2) non-overlapping with the first frequency band range.

At 710, base station 105-*i* may transmit a gap configuration message, which may be received by base station 105-*j*. The gap configuration message may indicate a measurement gap configuration corresponding to a measurement gap pattern configured by base station 105-*i*. For instance, if the identified gap pattern is a FR1 measurement gap pattern, then the gap configuration message may indicate a FR1 measurement gap configuration.

At 715, base station 105-*j* may transmit a set of frequency bands measured by the UE 115 within the first frequency band range or the second frequency band range (e.g., in response to the gap configuration message). For instance, if base station 105-*i* transmitted a FR1 measurement gap configuration to base station 105-*j*, then base station 105-*j* may assume that future updates to the FR1 measurement gap pattern may be carried by base station 105-*i*. As such, when base station 105-*j* determines to update the FR1 measurement gap configuration, base station 105-*j* may transmit a set or list of frequency bands (e.g., configured by base station 105-*j*) to base station 105-*i*, which may then update the FR1 measurement gap configuration based on the set or list. For instance, base station 105-*j* may assume that base station 105-*i* has taken on a fixed role and may act accordingly. This process may similar to an MN (e.g., base station 105-*i*) configuring the FR1 measurement gap configuration first, as described in FIG. 6.

In process flow 701, base station 105-*i* may be in communication with base station 105-*j* (e.g., via an X2 or Xn interface). Base station 105-*c* may represent an MN and base station 105-*d* may represent an SN.

At 720, base station 105-*j* may identify a gap pattern for a UE 115. In some cases, the gap pattern may be associated with a first frequency band range (e.g., FR1) or a second frequency band range (e.g., FR2) non-overlapping with the first frequency band range.

At 725, base station 105-*j* may transmit a gap configuration message, which may be received by base station 105-*i*. The gap configuration message may indicate a measurement gap configuration corresponding to a measurement gap pattern configured by base station 105-*j*. For instance, if the identified gap pattern is a FR1 measurement gap pattern, then the gap configuration message may indicate a FR1 measurement gap configuration.

At 730, base station 105-*i* may transmit a set of frequency bands measured by the UE 115 within the first frequency band range or the second frequency band range (e.g., in response to the gap configuration message). For instance, if base station 105-*j* transmitted a FR1 measurement gap configuration to base station 105-*i*, then base station 105-*i* may assume that future updates to the FR1 measurement gap pattern may be carried by base station 105-*j*. As such, when base station 105-*i* determines to update the FR1 measurement gap configuration, base station 105-*i* may transmit a set or list of frequency bands (e.g., configured by base station 105-*i*) to base station 105-*j*, which may then update the FR1 measurement gap configuration based on the set or list. This process may be similar to an SN (e.g., base station 105-*j*) configuring the FR1 measurement gap configuration first, as described in FIG. 6.

Figure 8:
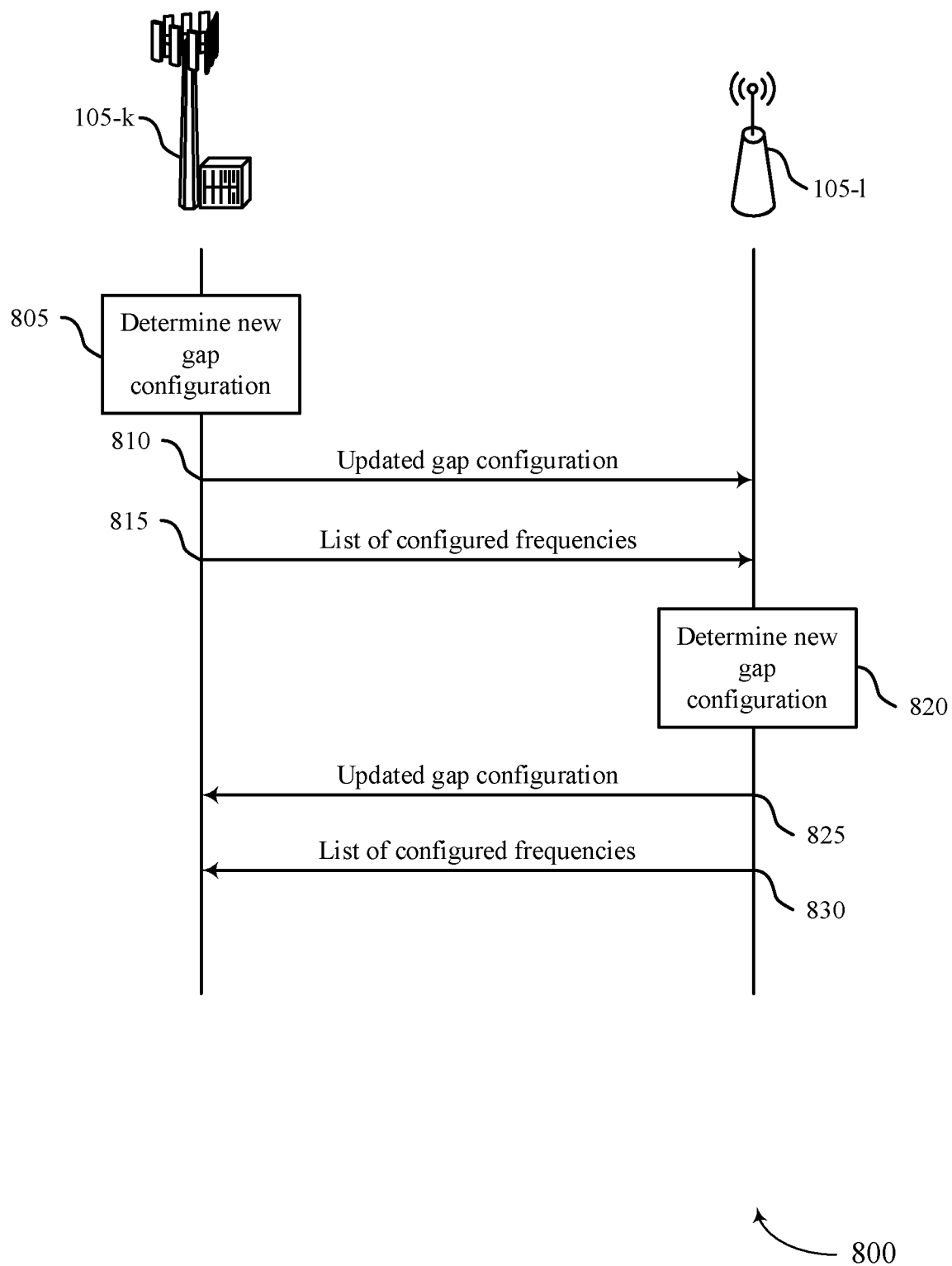
FIG. 8 illustrates an example of a process flow that supports measurement gap configuration and coordination in accordance with aspects of the present disclosure.

FIG. 8 illustrates an example of a process flow 800 that supports measurement gap configuration and coordination in accordance with aspects of the present disclosure. In some examples, process flow 800 may implement aspects of wireless communications systems 100 or 200. Process flow 800 may include a base station 105-*k* and a base station 105-*l*, which may be examples of base stations 105 as described with reference to FIG. 1 or 2.

Base station 105-*k* may be in communication with base station 105-*l* (e.g., via an X2 or Xn interface). Base station 105-*k* may represent an MN and base station 105-*l* may represent an SN. Both base station 105-*k* and 105-*l* may have a capability to operate in FR1 and FR2 (e.g., both may be gNBs). In some cases, both base station 105-*k* and base station 105-*l* may be able to modify or add measurement gap patterns for one or more of a set of bandwidths (e.g., LTE, FR1, and FR2).

For instance, at 805 base station 105-*k* may determine one or more new or updated measurement gap configurations (e.g., a FR1 measurement gap configuration). In some cases, the one or more new measurement gap configurations may be based on a list or set of base station 105-*l* configured frequencies received earlier (not shown), which may contain frequencies for one or more bandwidths (e.g., FR1, FR2, or LTE). At 810, base station 105-*k* may transmit an indication of the updated or new gap configuration(s) (e.g., within a CG-ConfigInfo message) to base station 105-*l*. At 815, base station 105-*k*, additionally or alternatively, may transmit a list or set of base station 105-*k* configured frequencies (e.g., within a CG-ConfigInfo message). In some cases, such a list may include frequencies for multiple bandwidths (e.g., FR1, FR2, or LTE), which may allow base station 105-*l* to configure a new or updated measurement gap configuration with minimal latency at a time in the future.

At 820, base station 105-*l* may determine one or more new or updated measurement gap configurations (e.g., a FR2 measurement gap configuration). In some cases, base station 105-*l* may determine the one or more new or updated measurement gap configurations based on receiving the list of base station 105-*k* configured frequencies. At 825, base station 105-*l* may transmit an indication of the one or more new or updated measurement gap configurations (e.g., within a CG-Config message) to base station 105-*k*. At 830, base station 105-*l* may, additionally or alternatively, transmit a list or set of base station 105-*l* configured frequencies (e.g., within a CG-Config message) to base station 105-*k*. In some cases, such a list may include frequencies for multiple bandwidths (e.g., FR1, FR2, or legacy LTE), which may allow base station 105-*k* to configure a new measurement gap configuration with minimal latency at a time in the future.

Figure 9:
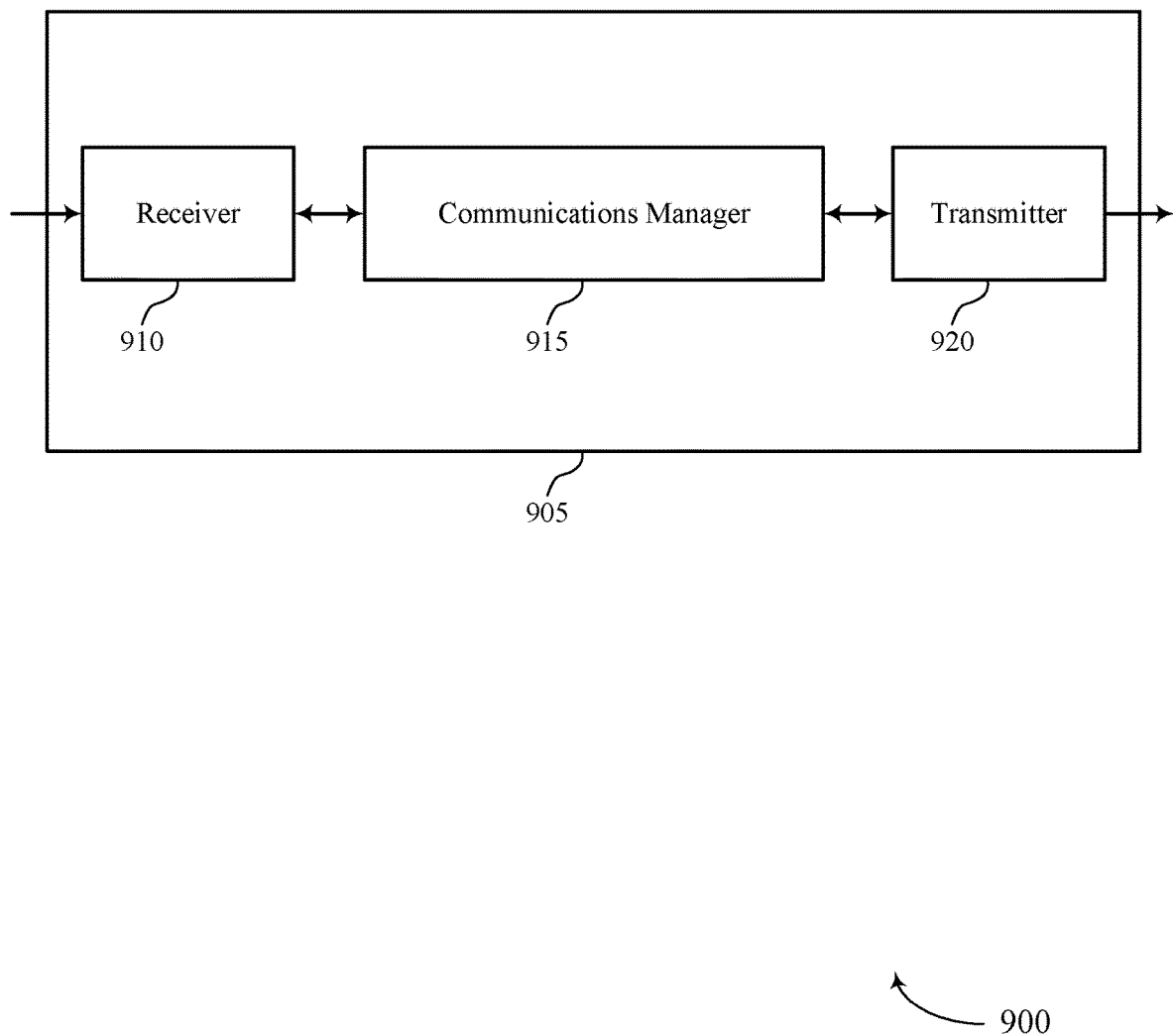
FIGS. 9 and 10 show block diagrams of devices that support measurement gap configuration and coordination in accordance with aspects of the present disclosure.

FIG. 9 shows a block diagram 900 of a device 905 that supports measurement gap configuration and coordination in accordance with aspects of the present disclosure. The device 905 may be an example of aspects of an SN or MN as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to measurement gap configuration and coordination, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a second network node in the wireless communications system, a first indication of a first set of frequency bands associated with a UE and a first gap pattern, a second indication of a second set of frequency bands associated with the UE and a second gap pattern, and/or a UE-specific set of frequency bands associated with the UE and a UE-specific gap pattern, update a gap pattern of the first gap pattern for at least one of the first set of frequency bands, the second gap pattern for the second set of frequency bands, the UE-specific gap pattern for the UE-specific set of frequency bands, or any combination thereof, and transmit, to the second network node, an updated gap configuration including an indication of the updated gap pattern.

The communications manager 915 may also transmit, to a second network node in the wireless communications system, a first indication of a first set of frequency bands associated with a UE and a first gap pattern, a second indication of a second set of frequency bands associated with the UE and a second gap pattern, and/or a UE-specific set of frequency bands associated with the UE and a UE-specific gap pattern and receive, from the second network node, an updated gap configuration including an indication of an updated gap pattern of the first gap pattern for at least one of the first set of frequency bands, the second gap pattern for the second set of frequency bands, the UE-specific gap pattern for the UE-specific set of frequency bands, or any combination thereof.

The communications manager 915 may also identify a gap pattern for a UE, the gap pattern associated with a first frequency band range or a second frequency band range non-overlapping with the first frequency band range, transmit a gap configuration message to a second network node in the wireless communications system, the gap configuration message indicating configuration of the gap pattern for the UE, and receive, from the second network node, a set of frequency bands within the first frequency band range or the second frequency band range measured by the UE in response to the gap configuration message. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a field programmable gate array (FPGA), or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
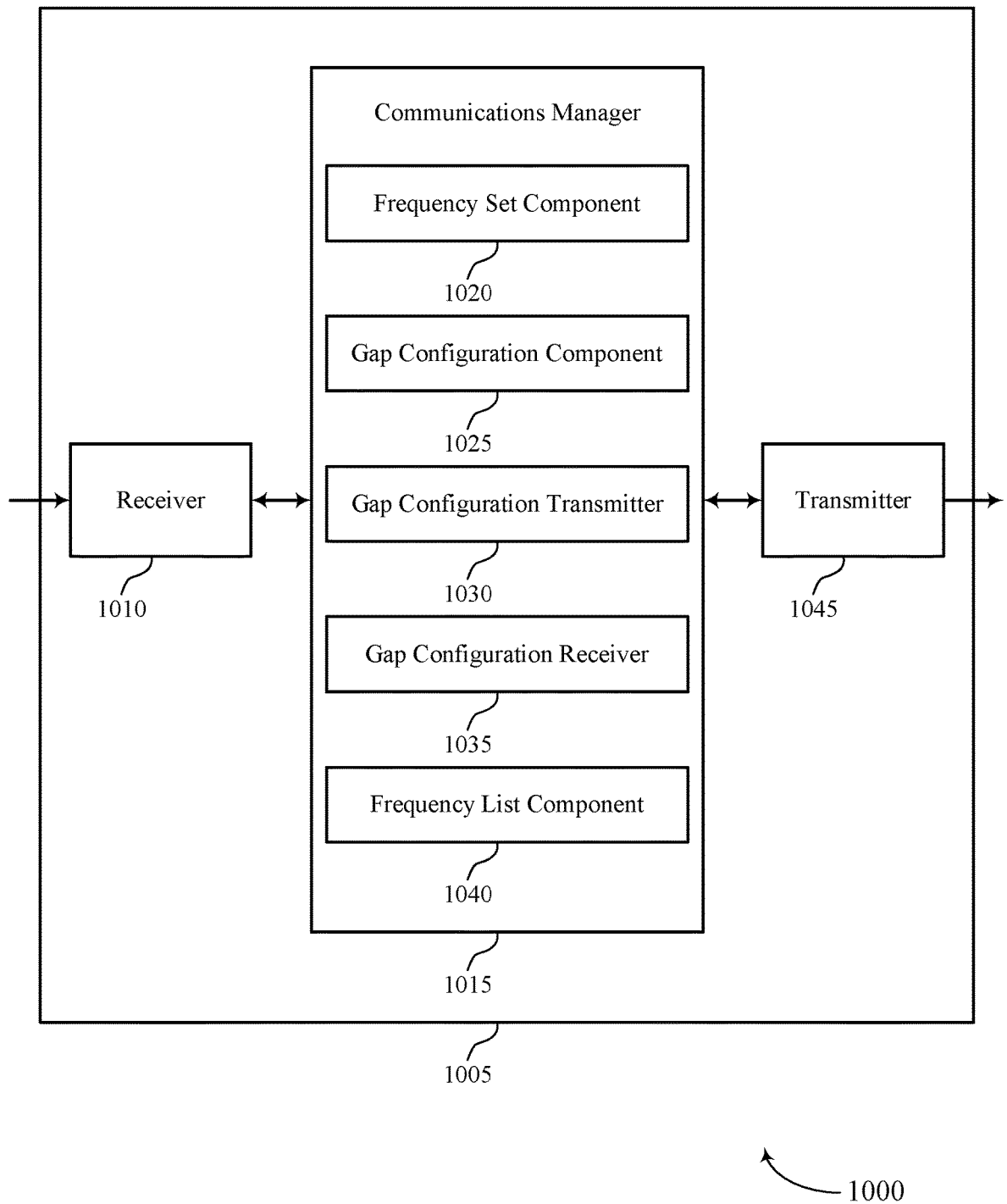

FIG. 10 shows a block diagram 1000 of a device 1005 that supports measurement gap configuration and coordination in accordance with aspects of the present disclosure. The device 1005 may be an example of aspects of a device 905, an SN, or MN as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to measurement gap configuration and coordination, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a frequency set component 1020, a gap configuration component 1025, a gap configuration transmitter 1030, a gap configuration receiver 1035, and a frequency list component 1040. The communications manager 1015 may be an example of aspects of the communications manager 1210 described herein.

The frequency set component 1020 may receive, from a second network node in the wireless communications system, a first indication of a first set of frequency bands associated with a UE and a first gap pattern, a second indication of a second set of frequency bands associated with the UE and a second gap pattern, and/or a UE-specific set of frequency bands associated with the UE and a UE-specific gap pattern.

The gap configuration component 1025 may update a gap pattern of the first gap pattern for at least one of the first set of frequency bands, the second gap pattern for the second set of frequency bands, the UE-specific gap pattern for the UE-specific set of frequency bands, or any combination thereof.

The gap configuration transmitter 1030 may transmit, to the second network node, an updated gap configuration including an indication of the updated gap pattern.

The frequency set component 1020 may transmit, to a second network node in the wireless communications system, a first indication of a first set of frequency bands associated with a UE and a first gap pattern, a second indication of a second set of frequency bands associated with the UE and a second gap pattern, and/or a UE-specific set of frequency bands associated with the UE and a UE-specific gap pattern.

The gap configuration receiver 1035 may receive, from the second network node, an updated gap configuration including an indication of an updated gap pattern of the first gap pattern for at least one of the first set of frequency bands, the second gap pattern for the second set of frequency bands, the UE-specific gap pattern for the UE-specific set of frequency bands, or any combination thereof.

The gap configuration component 1025 may identify a gap pattern for a UE, the gap pattern associated with a first frequency band range or a second frequency band range non-overlapping with the first frequency band range.

The gap configuration transmitter 1030 may transmit a gap configuration message to a second network node in the wireless communications system, the gap configuration message indicating configuration of the gap pattern for the UE.

The frequency list component 1040 may receive, from the second network node, a set of frequency bands within the first frequency band range or the second frequency band range measured by the UE in response to the gap configuration message.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
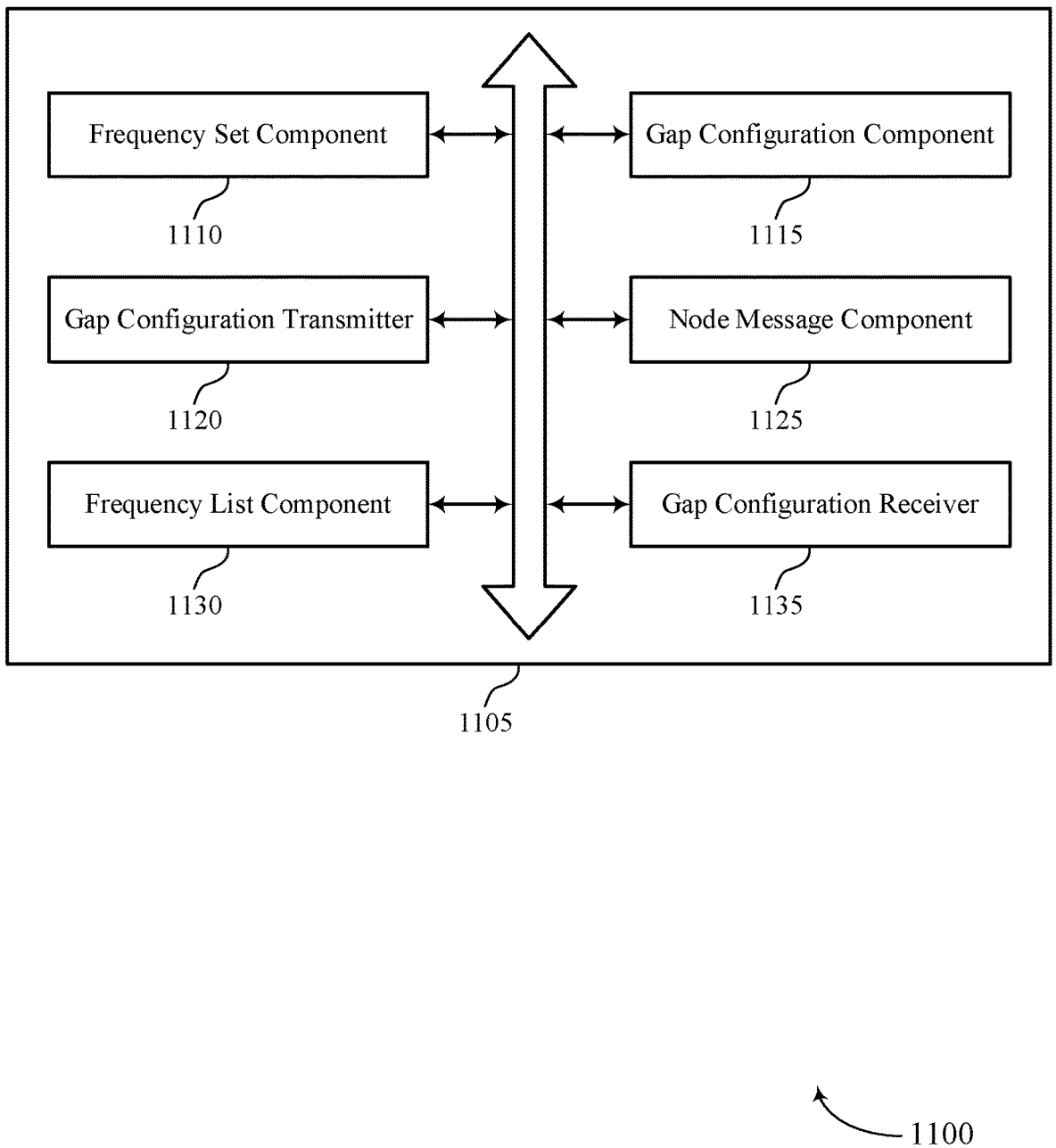
FIG. 11 shows a block diagram of a communications manager that supports measurement gap configuration and coordination in accordance with aspects of the present disclosure.

FIG. 11 shows a block diagram 1100 of a communications manager 1105 that supports measurement gap configuration and coordination in accordance with aspects of the present disclosure. The communications manager 1105 may be an example of aspects of a communications manager 915, or a communications manager 1015 described herein. The communications manager 1105 may include a frequency set component 1110, a gap configuration component 1115, a gap configuration transmitter 1120, a node message component 1125, a frequency list component 1130, and a gap configuration receiver 1135. Each of these modules may communicate, directly or indirectly, with one another (e.g., via one or more buses).

The frequency set component 1110 may receive, from a second network node in the wireless communications system, a first indication of a first set of frequency bands associated with a UE and a first gap pattern, a second indication of a second set of frequency bands associated with the UE and a second gap pattern, and/or a UE-specific set of frequency bands associated with the UE and a UE-specific gap pattern. In some examples, the frequency set component 1110 may transmit, to a second network node in the wireless communications system, a first indication of a first set of frequency bands associated with a UE and a first gap pattern, a second indication of a second set of frequency bands associated with the UE and a second gap pattern, and/or a UE-specific set of frequency bands associated with the UE and a UE-specific gap pattern.

In some cases, the first network node is one of a master network node and a secondary network node. In some cases, the second network node is the other of the master network node and the secondary network node. In some examples, the master network node and the secondary network node both include NR network nodes. In some cases, the master network node includes an NR network node and the secondary network node includes an EUTRAN network node. In some cases, the first and second sets of frequency bands are non-overlapping. In some cases, the gap pattern includes a measurement gap configuration, a measurement gap sharing configuration, or any combination thereof. In some cases, the first set of frequency bands include a set of sub 6 GHZ frequencies and the second set of frequency bands include a set of frequency bands above 6 GHZ.

The gap configuration component 1115 may update a gap pattern of the first gap pattern for at least one of the first set of frequency bands, the second gap pattern for the second set of frequency bands, the UE-specific gap pattern for the UE-specific set of frequency bands, or any combination thereof. In some examples, the gap configuration component 1115 may identify a gap pattern for a UE, the gap pattern associated with a first frequency band range or a second frequency band range non-overlapping with the first frequency band range. In some examples, the gap configuration component 1115 may determine a new gap pattern for each of the first set of frequency bands, the second set of frequency bands, and the UE-specific set of frequency bands, where the updated gap configuration indicates each new gap pattern, and where the first network node includes a master network node. In some examples, the gap configuration component 1115 may determine a new gap for at least one of the first set of frequency bands and the second set of frequency bands. In some examples, the gap configuration component 1115 may determine a new gap for at least one of the first set of frequency bands and the second set of frequency bands. In some examples, the gap configuration component 1115 may identify gap patterns for the UE for both the first frequency band range and the second frequency band range, where the gap configuration indicates the configured gap patterns. In some examples, the gap configuration component 1115 may identify the gap pattern for the UE for one of the first frequency band range or the second frequency band range.

The gap configuration transmitter 1120 may transmit, to the second network node, an updated gap configuration including an indication of the updated gap pattern. In some examples, the gap configuration transmitter 1120 may transmit a gap configuration message to a second network node in the wireless communications system, the gap configuration message indicating configuration of the gap pattern for the UE. In some examples, the gap configuration transmitter 1120 may transmit a gap type associated with the first set of frequency bands, the second set of frequency bands, or the UE-specific set of frequency bands based on updating the gap pattern. In some examples, the gap configuration transmitter 1120 may transmit, to the UE, a gap configuration indicating the new gap. In some examples, the gap configuration transmitter 1120 may transmit, to the UE, a gap configuration indicating the new gap.

The frequency list component 1130 may receive, from the second network node, a set of frequency bands within the first frequency band range or the second frequency band range measured by the UE in response to the gap configuration message. In some examples, the frequency list component 1130 may transmit, to the second network node, a list of frequency bands of the first and second sets of frequency bands associated with the new gap. In some examples, the frequency list component 1130 may identify a modification for the first gap pattern, the second gap pattern, or the UE-specific gap pattern. In some examples, the frequency list component 1130 may transmit a list of frequency bands measured by the UE based on the modification. In some examples, the frequency list component 1130 may transmit, to the second network node, a list of frequency bands of the first and second sets of frequency bands associated with the new gap.

The gap configuration receiver 1135 may receive, from the second network node, an updated gap configuration including an indication of an updated gap pattern of the first gap pattern for at least one of the first set of frequency bands, the second gap pattern for the second set of frequency bands, the UE-specific gap pattern for the UE-specific set of frequency bands, or any combination thereof. In some examples, the gap configuration receiver 1135 may receive a gap type associated with the first set of frequency bands, the second set of frequency bands, or the UE-specific set of frequency bands based on the updated gap configuration. In some examples, the gap configuration receiver 1135 may receive, from the second network node, a gap pattern configuration for the other of the first frequency band range or the second frequency band range.

The node message component 1125 may transmit a node message to the second network node indicating a UE configuration based on the new gap. In some examples, the node message component 1125 may receive, from the second network node, a node message indicating a UE configuration having a modified gap for at least one of the first and second sets of frequency bands. In some examples, the node message component 1125 may transmit a node message to the second network node indicating a UE configuration based on the new gap. In some examples, the node message component 1125 may receive, from the second network node, a node message indicating a UE configuration having a modified gap for at least one of the first and second sets of frequency bands.

Figure 12:
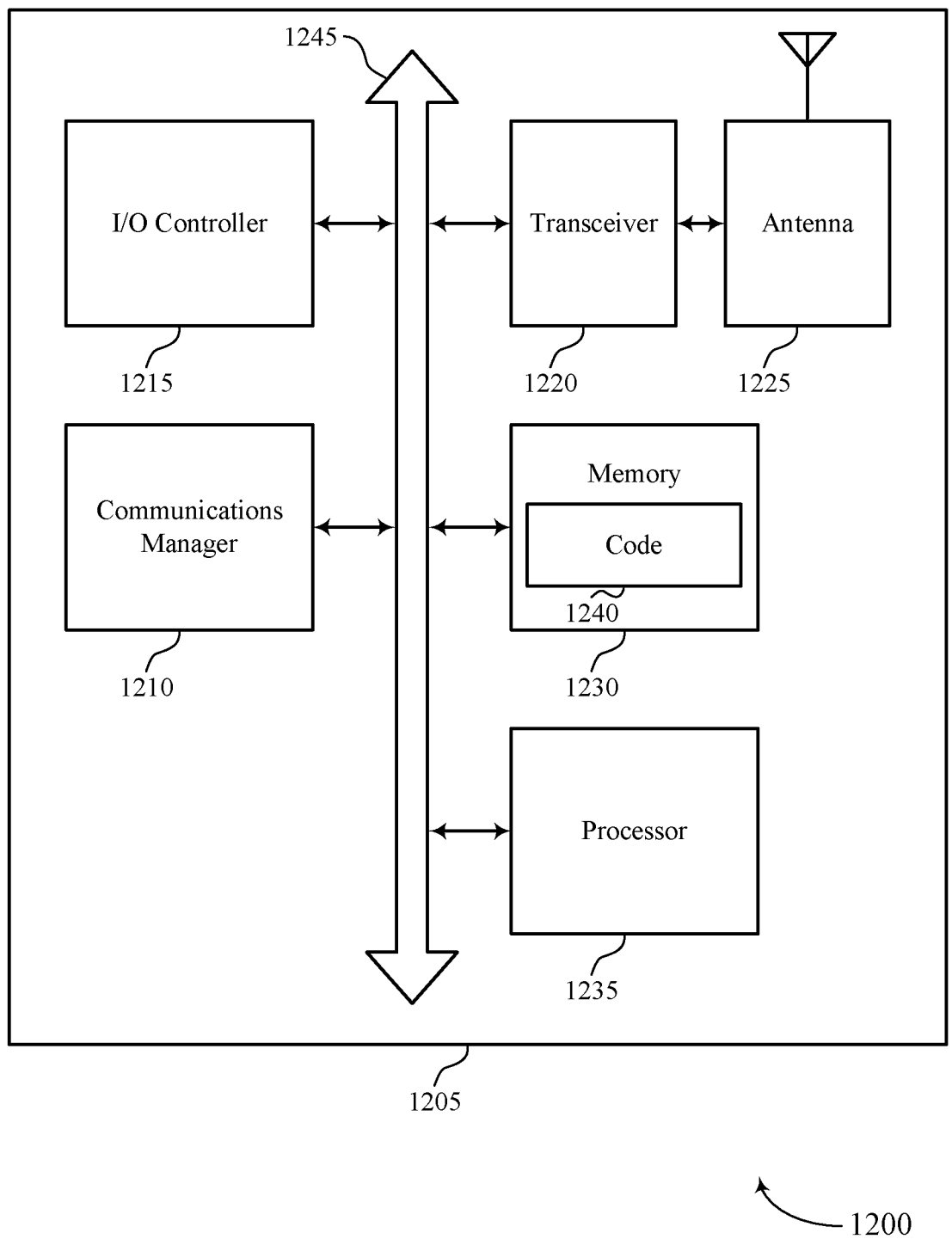
FIG. 12 shows a diagram of a system including a device that supports measurement gap configuration and coordination in accordance with aspects of the present disclosure.

FIG. 12 shows a diagram of a system 1200 including a device 1205 that supports measurement gap configuration and coordination in accordance with aspects of the present disclosure. The device 1205 may be an example of or include the components of device 905, device 1005, or a SN or MN as described herein. The device 1205 may include components for bi-directional voice and data communications including components for transmitting and receiving communications, including a communications manager 1210, an I/O controller 1215, a transceiver 1220, an antenna 1225, memory 1230, and a processor 1235. These components may be in electronic communication via one or more buses (e.g., bus 1245).

The communications manager 1210 may receive, from a second network node in the wireless communications system, a first indication of a first set of frequency bands associated with a UE and a first gap pattern, a second indication of a second set of frequency bands associated with the UE and a second gap pattern, and/or a UE-specific set of frequency bands associated with the UE and a UE-specific gap pattern, update a gap pattern of the first gap pattern for at least one of the first set of frequency bands, the second gap pattern for the second set of frequency bands, the UE-specific gap pattern for the UE-specific set of frequency bands, or any combination thereof, and transmit, to the second network node, an updated gap configuration including an indication of the updated gap pattern.

The communications manager 1210 may also transmit, to a second network node in the wireless communications system, a first indication of a first set of frequency bands associated with a UE and a first gap pattern, a second indication of a second set of frequency bands associated with the UE and a second gap pattern, and/or a UE-specific set of frequency bands associated with the UE and a UE-specific gap pattern and receive, from the second network node, an updated gap configuration including an indication of an updated gap pattern of the first gap pattern for at least one of the first set of frequency bands, the second gap pattern for the second set of frequency bands, the UE-specific gap pattern for the UE-specific set of frequency bands, or any combination thereof.

The communications manager 1210 may also identify a gap pattern for a UE, the gap pattern associated with a first frequency band range or a second frequency band range non-overlapping with the first frequency band range, transmit a gap configuration message to a second network node in the wireless communications system, the gap configuration message indicating configuration of the gap pattern for the UE, and receive, from the second network node, a set of frequency bands within the first frequency band range or the second frequency band range measured by the UE in response to the gap configuration message.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1240 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1235 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1235 may be configured to operate a memory array using a memory controller. In other cases, a memory controller may be integrated into the processor 1235. The processor 1235 may be configured to execute computer-readable instructions stored in a memory (e.g., the memory 1230) to cause the device 1205 to perform various functions (e.g., functions or tasks supporting measurement gap configuration and coordination).

The code 1240 may include instructions to implement aspects of the present disclosure, including instructions to support wireless communications. The code 1240 may be stored in a non-transitory computer-readable medium such as system memory or other type of memory. In some cases, the code 1240 may not be directly executable by the processor 1235 but may cause a computer (e.g., when compiled and executed) to perform functions described herein.

Figure 13:
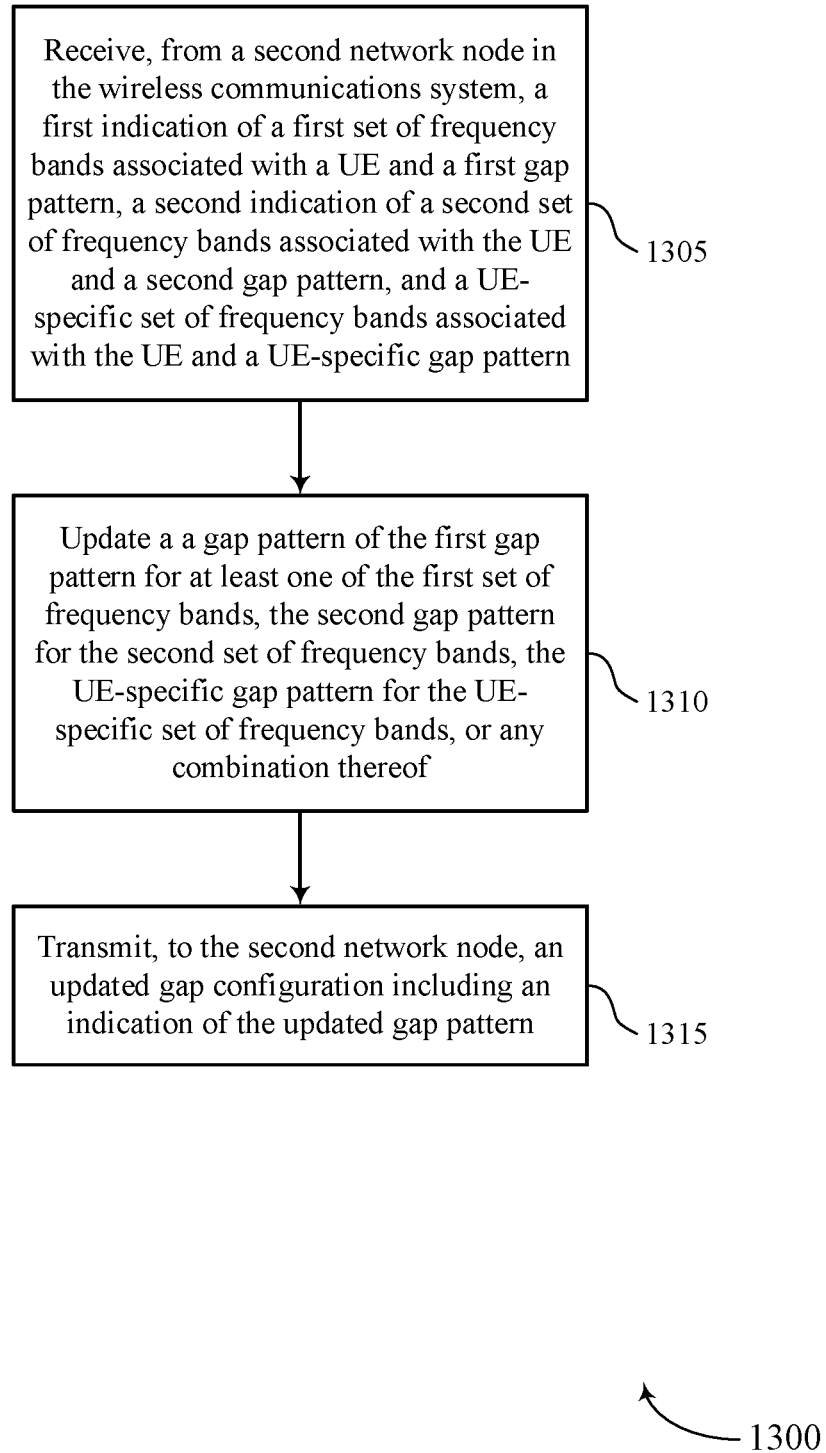
FIGS. 13 through 17 show flowcharts illustrating methods that support measurement gap configuration and coordination in accordance with aspects of the present disclosure.

FIG. 13 shows a flowchart illustrating a method 1300 that supports measurement gap configuration and coordination in accordance with aspects of the present disclosure. The operations of method 1300 may be implemented by an SN, an MN, or their components as described herein. For example, the operations of method 1300 may be performed by a communications manager as described with reference to FIGS. 9 through 12. In some examples, an SN or MN may execute a set of instructions to control the functional elements of the SN or MN to perform the functions described herein. Additionally or alternatively, an SN or MN may perform aspects of the functions described herein using special-purpose hardware.

At 1305, the SN or MN may receive, from a second network node in the wireless communications system, a first indication of a first set of frequency bands associated with a UE and a first gap pattern, a second indication of a second set of frequency bands associated with the UE and a second gap pattern, and/or a UE-specific set of frequency bands associated with the UE and a UE-specific gap pattern. The operations of 1305 may be performed according to the methods described herein. In some examples, aspects of the operations of 1305 may be performed by a frequency set component as described with reference to FIGS. 9 through 12.

At 1310, the SN or MN may update a gap pattern of the first gap pattern for at least one of the first set of frequency bands, the second gap pattern for the second set of frequency bands, the UE-specific gap pattern for the UE-specific set of frequency bands, or any combination thereof. The operations of 1310 may be performed according to the methods described herein. In some examples, aspects of the operations of 1310 may be performed by a gap configuration component as described with reference to FIGS. 9 through 12.

At 1315, the SN or MN may transmit, to the second network node, an updated gap configuration including an indication of the updated gap pattern. The operations of 1315 may be performed according to the methods described herein. In some examples, aspects of the operations of 1315 may be performed by a gap configuration transmitter as described with reference to FIGS. 9 through 12.

Figure 14:
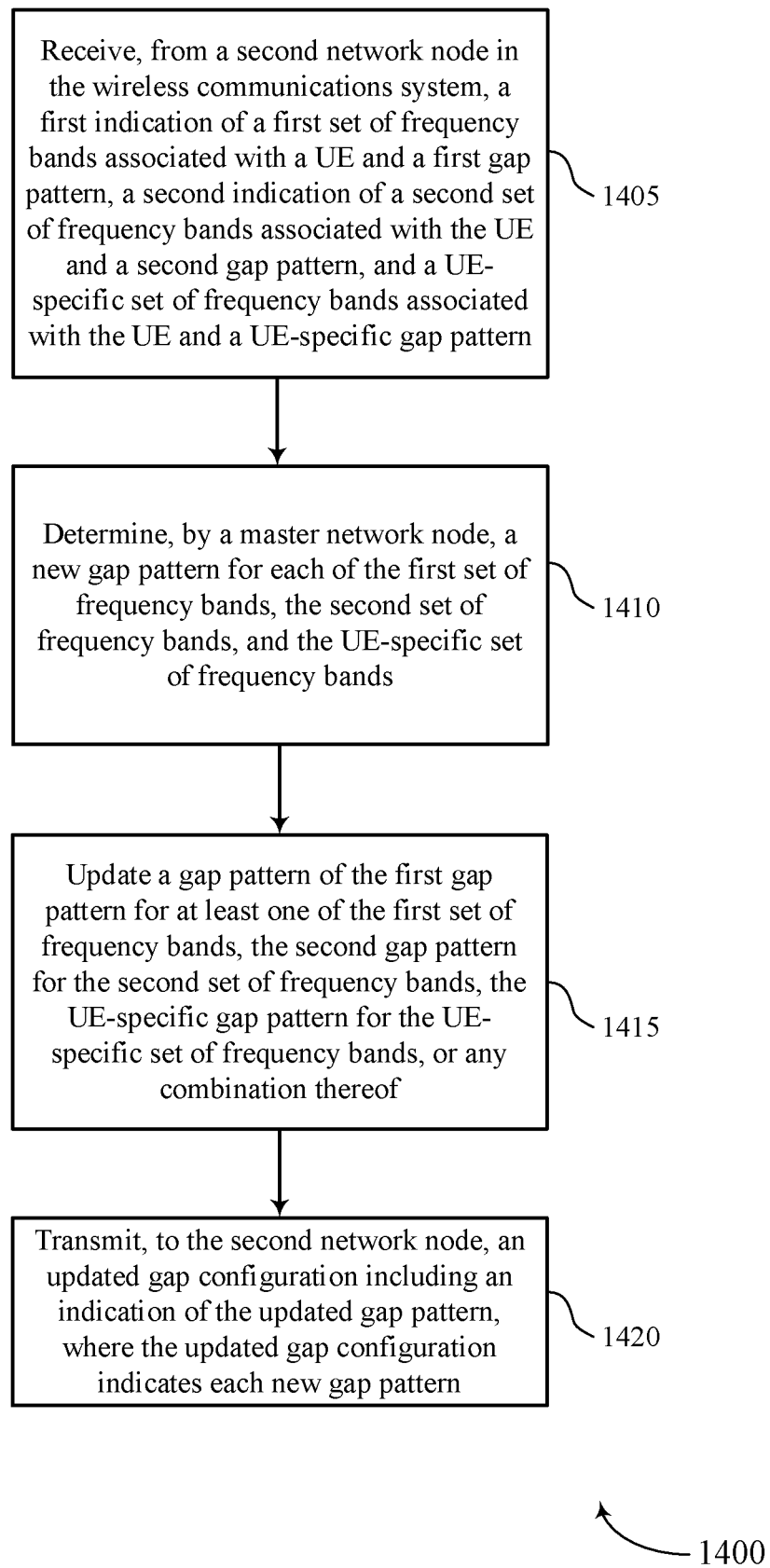

FIG. 14 shows a flowchart illustrating a method 1400 that supports measurement gap configuration and coordination in accordance with aspects of the present disclosure. The operations of method 1400 may be implemented by an SN, an MN, or their components as described herein. For example, the operations of method 1400 may be performed by a communications manager as described with reference to FIGS. 9 through 12. In some examples, an SN or MN may execute a set of instructions to control the functional elements of the SN or MN to perform the functions described herein. Additionally or alternatively, an SN or MN may perform aspects of the functions described herein using special-purpose hardware.

At 1405, the SN or MN may receive, from a second network node in the wireless communications system, a first indication of a first set of frequency bands associated with a UE and a first gap pattern, a second indication of a second set of frequency bands associated with the UE and a second gap pattern, and/or a UE-specific set of frequency bands associated with the UE and a UE-specific gap pattern. The operations of 1405 may be performed according to the methods described herein. In some examples, aspects of the operations of 1405 may be performed by a frequency set component as described with reference to FIGS. 9 through 12.

At 1410, the SN or MN may determine a new gap pattern for each of the first set of frequency bands, the second set of frequency bands, and the UE-specific set of frequency bands, where the first network node includes a master network node. The operations of 1410 may be performed according to the methods described herein. In some examples, aspects of the operations of 1410 may be performed by a gap configuration component as described with reference to FIGS. 9 through 12.

At 1415, the SN or MN may update a gap pattern of the first gap pattern for at least one of the first set of frequency bands, the second gap pattern for the second set of frequency bands, the UE-specific gap pattern for the UE-specific set of frequency bands, or any combination thereof. The operations of 1415 may be performed according to the methods described herein. In some examples, aspects of the operations of 1415 may be performed by a gap configuration component as described with reference to FIGS. 9 through 12.

At 1420, the SN or MN may transmit, to the second network node, an updated gap configuration including an indication of the updated gap pattern, where the updated gap configuration indicates each new gap pattern. The operations of 1420 may be performed according to the methods described herein. In some examples, aspects of the operations of 1420 may be performed by a gap configuration transmitter as described with reference to FIGS. 9 through 12.

Figure 15:
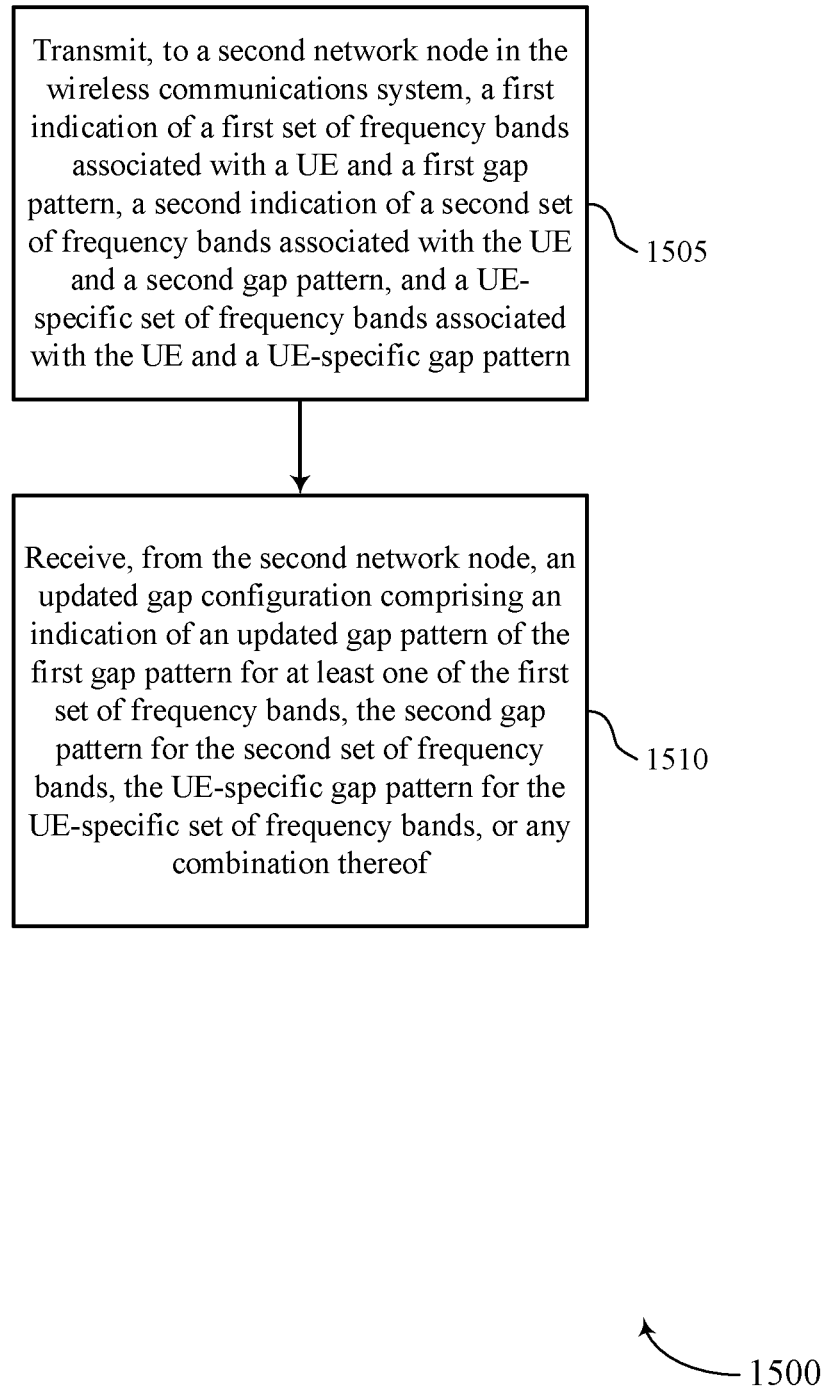

FIG. 15 shows a flowchart illustrating a method 1500 that supports measurement gap configuration and coordination in accordance with aspects of the present disclosure. The operations of method 1500 may be implemented by an SN, an MN, or their components as described herein. For example, the operations of method 1500 may be performed by a communications manager as described with reference to FIGS. 9 through 12. In some examples, an SN or MN may execute a set of instructions to control the functional elements of the SN or MN to perform the functions described herein. Additionally or alternatively, an SN or MN may perform aspects of the functions described herein using special-purpose hardware.

At 1505, the SN or MN may transmit, to a second network node in the wireless communications system, a first indication of a first set of frequency bands associated with a UE and a first gap pattern, a second indication of a second set of frequency bands associated with the UE and a second gap pattern, and/or a UE-specific set of frequency bands associated with the UE and a UE-specific gap pattern. The operations of 1505 may be performed according to the methods described herein. In some examples, aspects of the operations of 1505 may be performed by a frequency set component as described with reference to FIGS. 9 through 12.

At 1510, the SN or MN may receive, from the second network node, an updated gap configuration including an indication of an updated gap pattern of the first gap pattern for at least one of the first set of frequency bands, the second gap pattern for the second set of frequency bands, the UE-specific gap pattern for the UE-specific set of frequency bands, or any combination thereof. The operations of 1510 may be performed according to the methods described herein. In some examples, aspects of the operations of 1510 may be performed by a gap configuration receiver as described with reference to FIGS. 9 through 12.

Figure 16:
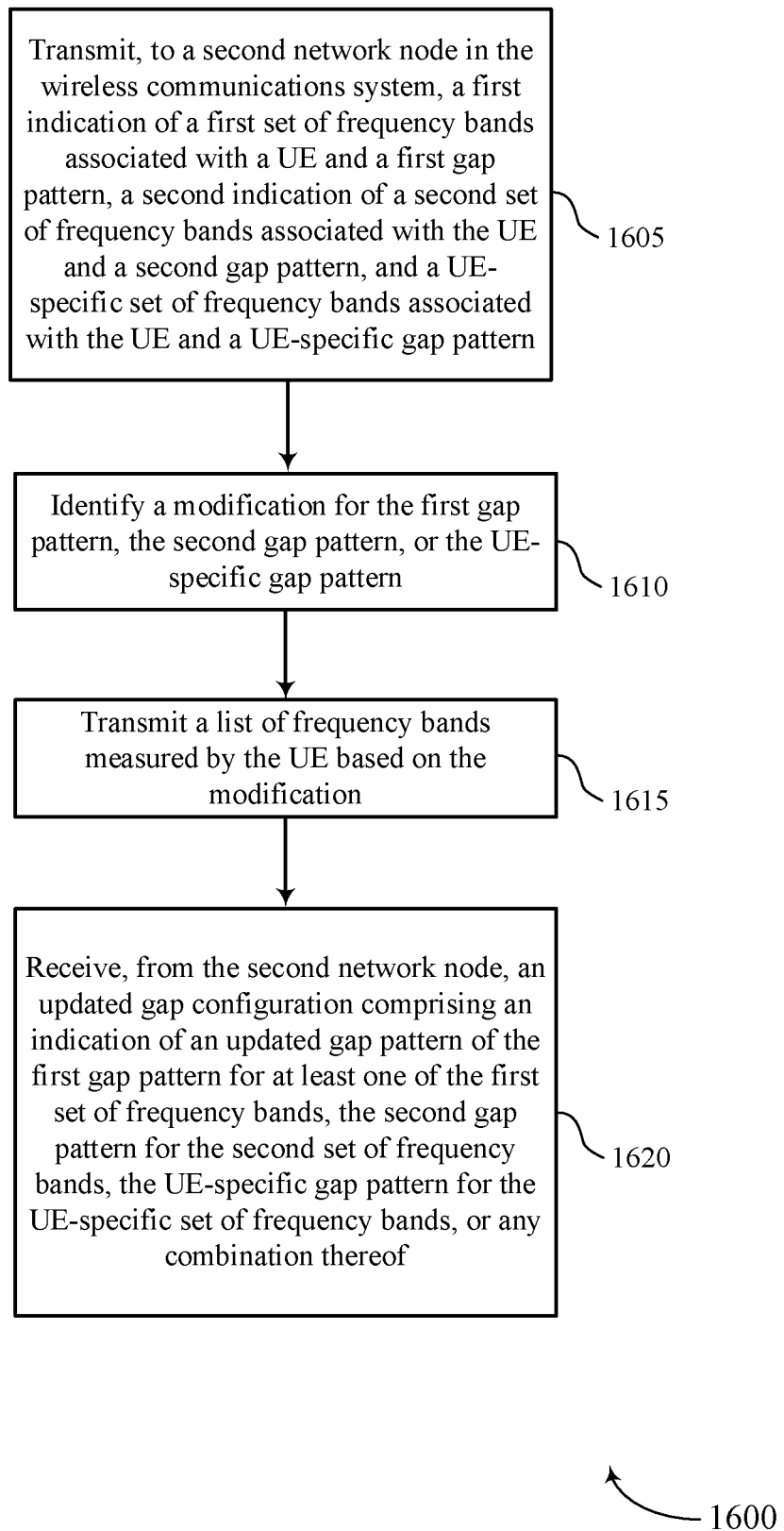

FIG. 16 shows a flowchart illustrating a method 1600 that supports measurement gap configuration and coordination in accordance with aspects of the present disclosure. The operations of method 1600 may be implemented by an SN, an MN, or their components as described herein. For example, the operations of method 1600 may be performed by a communications manager as described with reference to FIGS. 9 through 12. In some examples, an SN or MN may execute a set of instructions to control the functional elements of the SN or MN to perform the functions described herein. Additionally or alternatively, a SN or MN may perform aspects of the functions described herein using special-purpose hardware.

At 1605, the SN or MN may transmit, to a second network node in the wireless communications system, a first indication of a first set of frequency bands associated with a UE and a first gap pattern, a second indication of a second set of frequency bands associated with the UE and a second gap pattern, and/or a UE-specific set of frequency bands associated with the UE and a UE-specific gap pattern. The operations of 1605 may be performed according to the methods described herein. In some examples, aspects of the operations of 1605 may be performed by a frequency set component as described with reference to FIGS. 9 through 12.

At 1610, the SN or MN may identify a modification for the first gap pattern, the second gap pattern, or the UE-specific gap pattern. The operations of 1610 may be performed according to the methods described herein. In some examples, aspects of the operations of 1610 may be performed by a frequency list component as described with reference to FIGS. 9 through 12.

At 1615, the SN or MN may transmit a list of frequency bands measured by the UE based on the modification. The operations of 1615 may be performed according to the methods described herein. In some examples, aspects of the operations of 1615 may be performed by a frequency list component as described with reference to FIGS. 9 through 12.

At 1620, the SN or MN may receive, from the second network node, an updated gap configuration including an indication of an updated gap pattern of the first gap pattern for at least one of the first set of frequency bands, the second gap pattern for the second set of frequency bands, the UE-specific gap pattern for the UE-specific set of frequency bands, or any combination thereof. The operations of 1620 may be performed according to the methods described herein. In some examples, aspects of the operations of 1620 may be performed by a gap configuration receiver as described with reference to FIGS. 9 through 12.

Figure 17:
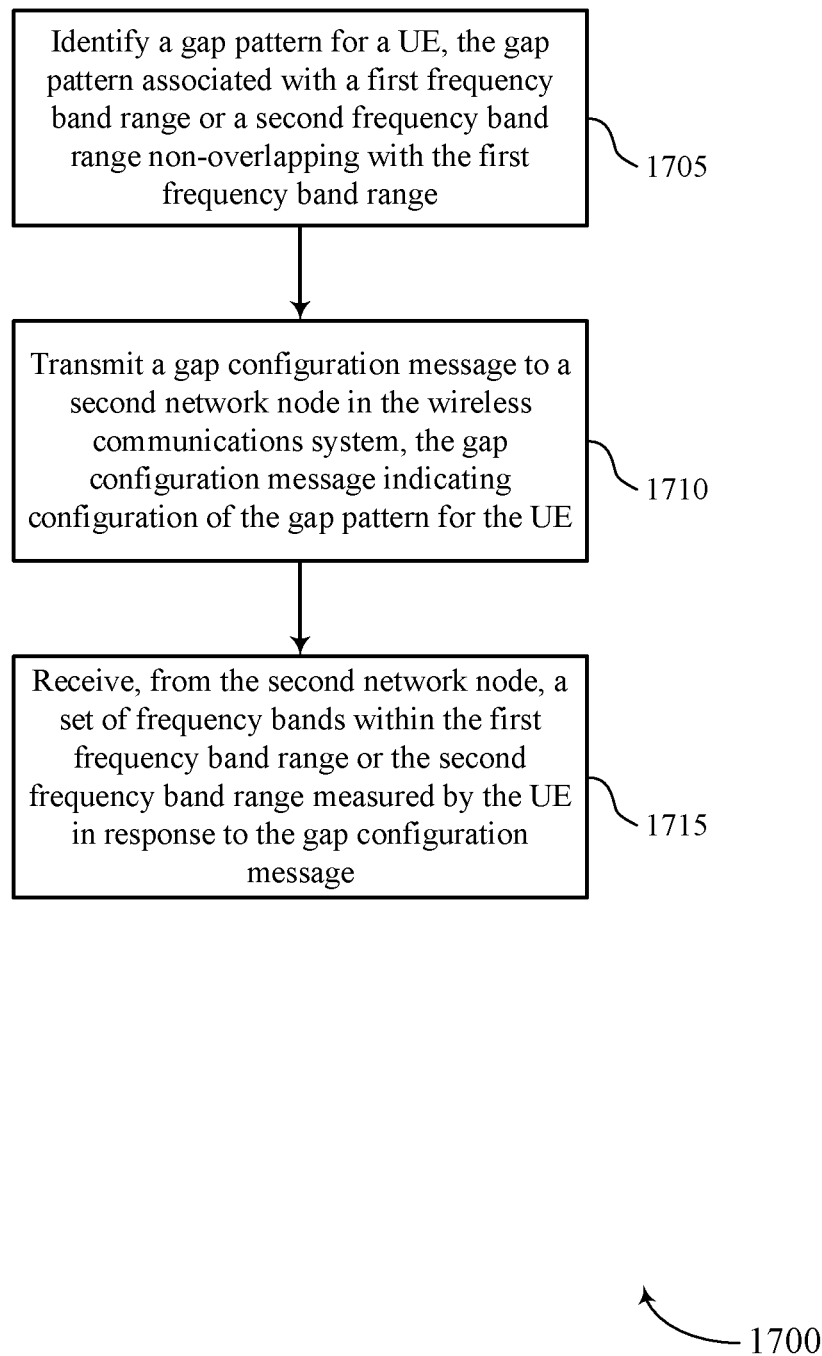

FIG. 17 shows a flowchart illustrating a method 1700 that supports measurement gap configuration and coordination in accordance with aspects of the present disclosure. The operations of method 1700 may be implemented by a SN or MN or its components as described herein. For example, the operations of method 1700 may be performed by a communications manager as described with reference to FIGS. 9 through 12. In some examples, a SN or MN may execute a set of instructions to control the functional elements of the SN or MN to perform the functions described herein. Additionally or alternatively, a SN or MN may perform aspects of the functions described herein using special-purpose hardware.

At 1705, the SN or MN may identify a gap pattern for a UE, the gap pattern associated with a first frequency band range or a second frequency band range non-overlapping with the first frequency band range. The operations of 1705 may be performed according to the methods described herein. In some examples, aspects of the operations of 1705 may be performed by a gap configuration component as described with reference to FIGS. 9 through 12.

At 1710, the SN or MN may transmit a gap configuration message to a second network node in the wireless communications system, the gap configuration message indicating configuration of the gap pattern for the UE. The operations of 1710 may be performed according to the methods described herein. In some examples, aspects of the operations of 1710 may be performed by a gap configuration transmitter as described with reference to FIGS. 9 through 12.

At 1715, the SN or MN may receive, from the second network node, a set of frequency bands within the first frequency band range or the second frequency band range measured by the UE in response to the gap configuration message. The operations of 1715 may be performed according to the methods described herein. In some examples, aspects of the operations of 1715 may be performed by a frequency list component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first network node in a wireless communications system, comprising:
   identifying a gap pattern for a user equipment (UE), the gap pattern associated with a first frequency band range or a second frequency band range non-overlapping with the first frequency band range;
   transmitting a gap configuration message to a second network node in the wireless communications system, the gap configuration message indicating a configuration of the gap pattern for the UE; and
   receiving, from the second network node and in response to the gap configuration message, a list of frequency bands within the first frequency band range and the second frequency band range measured by the UE.

2. The method of claim 1, further comprising:
   identifying gap patterns for the UE for both the first frequency band range and the second frequency band range, wherein the gap configuration message indicates the identified gap patterns.

3. The method of claim 1, further comprising:
   identifying the gap pattern for the UE for one of the first frequency band range or the second frequency band range; and
   receiving, from the second network node, a gap pattern configuration for the other of the first frequency band range or the second frequency band range.

4. The method of claim 1, wherein:
   the first network node is one of a master network node and a secondary network node; and
   the second network node is the other of the master network node and the secondary network node.

5. The method of claim 4, wherein the master network node comprises a new radio (NR) network node and the secondary network node comprises a evolved universal terrestrial radio access network (EUTRAN) network node.

6. The method of claim 4, wherein the master network node and the secondary network node both comprise new radio (NR) network nodes.

7. The method of claim 1, wherein the gap pattern comprises a measurement gap configuration, a measurement gap sharing configuration, or any combination thereof.

8. The method of claim 1, wherein the first frequency band range comprises a sub 6 gigahertz (GHz) frequency band range and the second frequency band range comprises a frequency band range in a range above 6 GHz.

9. An apparatus for wireless communications at a first network node in a wireless communications system, comprising:
   at least one processor, and
   at least one memory coupled with the at least one processor, with instructions stored in the at least one memory, the instructions being executable by the at least one processor, individually or in any combination, to cause the apparatus to:
     identify a gap pattern for a user equipment (UE), the gap pattern associated with a first frequency band range or a second frequency band range non-overlapping with the first frequency band range;
     transmit a gap configuration message to a second network node in the wireless communications system, the gap configuration message indicating a configuration of the gap pattern for the UE; and
     receive, from the second network node and in response to the gap configuration message, a list of frequency bands within the first frequency band range and the second frequency band range measured by the UE.

10. The apparatus of claim 9, wherein the instructions are executable by the at least one processor, individually or in any combination, to cause the apparatus to:
    identify gap patterns for the UE for both the first frequency band range and the second frequency band range, wherein the gap configuration message indicates the identified gap patterns.

11. The apparatus of claim 9, wherein the instructions are executable by the at least one processor, individually or in any combination, to cause the apparatus to:
    identify the gap pattern for the UE for one of the first frequency band range or the second frequency band range; and
    receive, from the second network node, a gap pattern configuration for the other of the first frequency band range or the second frequency band range.

12. The apparatus of claim 9, wherein:
    the first network node is one of a master network node and a secondary network node; and
    the second network node is the other of the master network node and the secondary network node.

13. The apparatus of claim 12, wherein the master network node comprises a new radio (NR) network node and the secondary network node comprises a evolved universal terrestrial radio access network (EUTRAN) network node.

14. The apparatus of claim 12, wherein the master network node and the secondary network node both comprise new radio (NR) network nodes.

15. The apparatus of claim 9, wherein the gap pattern comprises a measurement gap configuration, a measurement gap sharing configuration, or any combination thereof.

16. The apparatus of claim 9, wherein the first frequency band range comprises a sub 6 gigahertz (GHz) frequency band range and the second frequency band range comprises a frequency band range in a range above 6 GHz.

17. A first network node in a wireless communications system for wireless communications, comprising:
    means for identifying a gap pattern for a user equipment (UE), the gap pattern associated with a first frequency band range or a second frequency band range non-overlapping with the first frequency band range;
    means for transmitting a gap configuration message to a second network node in the wireless communications system, the gap configuration message indicating a configuration of the gap pattern for the UE; and
    means for receiving, from the second network node and in response to the gap configuration message, a list of frequency bands within the first frequency band range and the second frequency band range measured by the UE.

18. The first network node of claim 17, further comprising:
    means for identifying gap patterns for the UE for both the first frequency band range and the second frequency band range, wherein the gap configuration message indicates the identified gap patterns.

19. The first network node in of claim 17, further comprising:
    means for identifying the gap pattern for the UE for one of the first frequency band range or the second frequency band range; and
    means for receiving, from the second network node, a gap pattern configuration for the other of the first frequency band range or the second frequency band range.

20. The first network node of claim 17, wherein:
    the first network node is one of a master network node and a secondary network node; and
    the second network node is the other of the master network node and the secondary network node.

21. The first network node of claim 20, wherein the master network node comprises a new radio (NR) network node and the secondary network node comprises a evolved universal terrestrial radio access network (EUTRAN) network node.

22. The first network node of claim 20, wherein:
    the master network node and the secondary network node both comprise new radio (NR) network nodes.

23. The first network node of claim 17, wherein the gap pattern comprises a measurement gap configuration, a measurement gap sharing configuration, or any combination thereof.

24. A non-transitory computer-readable medium storing code for wireless communications at a first network node, the code comprising instructions executable by one or more processors to:
    identify a gap pattern for a user equipment (UE), the gap pattern associated with a first frequency band range or a second frequency band range non-overlapping with the first frequency band range;
    transmit a gap configuration message to a second network node in a wireless communications system, the gap configuration message indicating a configuration of the gap pattern for the UE; and
    receive, from the second network node and in response to the gap configuration message, a list of frequency bands within the first frequency band range and the second frequency band range measured by the UE.

25. The non-transitory computer-readable medium of claim 24, wherein the instructions are further executable by the one or more processors to:
    identify gap patterns for the UE for both the first frequency band range and the second frequency band range, wherein the gap configuration message indicates the identified gap patterns.

26. The non-transitory computer-readable medium of claim 24, wherein the instructions are further executable by the one or more processors to:
    identify the gap pattern for the UE for one of the first frequency band range or the second frequency band range; and
    receive, from the second network node, a gap pattern configuration for the other of the first frequency band range or the second frequency band range.

27. The non-transitory computer-readable medium of claim 24, wherein:
    the first network node is one of a master network node and a secondary network node; and
    the second network node is the other of the master network node and the secondary network node.

28. The non-transitory computer-readable medium of claim 27, wherein the master network node comprises a new radio (NR) network node and the secondary network node comprises a evolved universal terrestrial radio access network (EUTRAN) network node.

29. The non-transitory computer-readable medium of claim 27, wherein:
    the master network node and the secondary network node both comprise new radio (NR) network nodes.

30. The non-transitory computer-readable medium of claim 24, wherein the gap pattern comprises a measurement gap configuration, a measurement gap sharing configuration, or any combination thereof.

* * * * *